United States Patent
Yamamoto et al.

(10) Patent No.: US 7,748,910 B2
(45) Date of Patent: Jul. 6, 2010

(54) OPTICAL SYSTEM AND METHOD OF MANUFACTURING THE SAME

(75) Inventors: Rei Yamamoto, Tsukuba (JP); Toshihiro Kuroda, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/224,486

(22) PCT Filed: Feb. 27, 2007

(86) PCT No.: PCT/JP2007/053595

§ 371 (c)(1),
(2), (4) Date: Aug. 28, 2008

(87) PCT Pub. No.: WO2007/099935

PCT Pub. Date: Sep. 7, 2007

(65) Prior Publication Data

US 2009/0067787 A1    Mar. 12, 2009

(30) Foreign Application Priority Data

Feb. 28, 2006 (JP) ............................ 2006-053108

(51) Int. Cl.
*G02B 6/36* (2006.01)
*G02B 6/26* (2006.01)
*G02B 6/30* (2006.01)

(52) U.S. Cl. ............................ 385/65; 385/49; 385/50; 385/52; 385/83

(58) Field of Classification Search .................... 385/65, 385/83, 49, 50, 52
See application file for complete search history.

(56) References Cited

U.S. PATENT DOCUMENTS

| 5,425,118 A * | 6/1995 | Sugihara et al. ............... 385/51 |
| 5,611,014 A * | 3/1997 | Basavanhally ............... 385/90 |
| 5,732,173 A * | 3/1998 | Bylander et al. ............... 385/49 |
| 5,778,120 A * | 7/1998 | Asakura et al. ............... 385/49 |
| 5,907,649 A * | 5/1999 | Acklin et al. ................. 385/49 |
| 6,181,854 B1 * | 1/2001 | Kojima et al. ................. 385/49 |
| 6,456,767 B2 * | 9/2002 | Terashima .................... 385/49 |
| 6,516,114 B2 * | 2/2003 | Zhao et al. .................... 385/30 |
| 6,553,173 B1 * | 4/2003 | Goto .......................... 385/137 |
| 6,577,803 B2 * | 6/2003 | Matsumoto et al. .......... 385/137 |

(Continued)

FOREIGN PATENT DOCUMENTS

JP   62-035308    3/1987

(Continued)

*Primary Examiner*—Charlie Peng
(74) *Attorney, Agent, or Firm*—Antonelli, Terry, Stout & Kraus, LLP.

(57) ABSTRACT

An optical system comprising a substrate and an optical waveguide which is formed on the substrate and to which optical fibers are optically coupled. The optical waveguide has a plurality of straight core portions which obliquely intersect each other. The substrate has positioning sections for positioning a plurality of optical fibers optically coupled to two or more of the plurality of the core portions, the positioning sections having grooves on which the respective optical fibers are supported. When the plurality of optical fibers are supported on the respective grooves, offsets between centers of the plurality of the core portions and respective centers of the plurality of the optical fibers coupled to the core portions are equal to or less than 5 μm.

36 Claims, 11 Drawing Sheets

U.S. PATENT DOCUMENTS

| | | | |
|---|---|---|---|
| 7,394,955 B2 * | 7/2008 | Hata | 385/52 |
| 2003/0021572 A1 * | 1/2003 | Steinberg | 385/137 |

FOREIGN PATENT DOCUMENTS

| | | |
|---|---|---|
| JP | 06-140639 | 5/1994 |
| JP | 07-261053 | 10/1995 |
| JP | 09-159866 | 6/1997 |
| JP | 10-046369 | 2/1998 |
| JP | 10-332992 | 12/1998 |
| JP | 11-014860 | 1/1999 |
| JP | 2002-090560 | 3/2002 |
| JP | 2004-198653 | 7/2004 |
| JP | 2004-233982 | 8/2004 |
| JP | 2004-302243 | 10/2004 |
| JP | 2005-037444 | 2/2005 |
| WO | WO 2004/088378 A1 | 10/2004 |

* cited by examiner

OPTICAL SYSTEM AND METHOD OF MANUFACTURING THE SAME

FIELD OF THE INVENTION

The present invention relates to an optical system and a method of manufacturing the same, more specifically, to an optical system in which an optical fiber is located on a substrate.

BACKGROUND OF THE INVENTION

An optical system provided with an optical element such as an optical fiber, an optical waveguide and an optical transmitter/receiver is known. An example of such an optical system includes an optical multiplexer formed with an optical waveguide having core portions which obliquely intersect each other (please refer to, for example, Patent Publications 1-3 listed later).

FIG. 15 is a schematic view of an optical multiplexer, or an optical system, disclosed in the Patent Publication 1.

This optical multiplexer 200 has an optical waveguide 201 extending in an light-propagating direction A, which optical guide 201 has straight core portions 202a, 202b which obliquely intersect each other. The optical waveguide 201 also has curved extended portions 204a, 204b, 204c formed so as to continue the core portions 202a, 202b in order to optically couple the core portions 202a, 202b to optical fibers 203a, 203b, 203c arranged in the light-propagating direction A. This optical multiplexer 200 is suitable for a case in which the optical fibers 203a, 203b, 203c are coupled to the extended portions 204a, 204b, 204c in optical-array forms 205a, 205b. The optical fibers 203a, 203b, 203c are positioned and supported with a high degree of accuracy relative to the extended portions 204a, 204b, 204c by V-shaped cross-sectional grooves 206 formed on the optical fiber arrays 205a, 205b by means of anisotropic etching.

FIG. 16 is a schematic view of an optical transmitter/receiver which is an optical system disclosed in the Patent Publication 2.

This optical transmitter/receiver 210 has a substrate 211 extending in a light-propagating direction A and an optical waveguide 212 laminated on the substrate 211. The optical waveguide 212 has straight core portions 214a, 214b which obliquely intersect each other at an intersection 213, and an optical filter 215 is disposed at the intersection 213. An optical fiber 216 is optically coupled to one end of the one core portion 214a, while an optical receiver 217 is optically coupled to the other end thereof. Further, an optical transmitter 218 is optically coupled to the other core portion 214b. The substrate 211 is made of a material having a crystal axis, and a crystal-axis direction conforms to a direction of an optical axis 216a of the optical fiber 216. The optical fiber 216 is positioned and supported with a high degree of accuracy relative to the core portion 214a by a V-shaped cross-sectional groove 219 formed on the substrate 211 in the crystal-axis direction by means of anisotropic etching.

FIG. 17 is a schematic view of an optical multiplexer which is an optical system disclosed in the Patent Publication 3.

This optical multiplexer 230 has a substrate 231 extending in a light-propagating direction A and an optical waveguide 232 located on and fixed to the substrate 231. The substrate 231 and the optical waveguide 232 are made separately. The optical waveguide 232 has straight core portions 234a, 234b which obliquely intersect each other at an intersection 233, and an optical filter 235 is disposed at the intersection 233. Optical fibers 236a, 236b are optically coupled to opposite ends of the one core portion 234b, while an optical fiber 236c is optically coupled to one end of the other core portion 234a. The optical fibers 236a, 236b, 236c are positioned and supported on rectangular cross-sectional recesses 237 formed on the substrate 231.

Patent Publication 1: Japanese Patent Laid-open Publication No. 10-332992
Patent Publication 2: Japanese Patent Laid-open Publication No. 2002-90560
Patent Publication 3: Japanese Utility Model Laid-open Publication No. 62-35308

DISCLOSURE OF THE PRESENT INVENTION

Problem to be Solved by the Present Invention

In the optical system disclosed in the Patent Publication 1, although all of the optical fibers are positioned relative to the extended portions with a high degree of accuracy, since the extended portions are curved, a length of the optical system in the light-propagating direction becomes long and an optical loss is increased.

On the other hand, in the optical system disclosed in the Patent Publication 2, since the optical fiber, the optical transmitter and the optical receiver are coupled to the straight core portions which obliquely intersect each other, a length of the optical system in the light-propagating direction can be reduced. However, instead of the optical transmitter, a second optical fiber cannot be coupled to the core portion with a high degree of accuracy. Specifically, since the crystal axis of the substrate conforms to the optical axis of the (first) optical fiber, the second optical fiber has to be obliquely disposed relative to the crystal axis. A groove for positioning the second optical fiber which groove's direction does not conform to that of the crystal axis cannot be formed by anisotropic etching, because the anisotropic etching can form a groove in the crystal-axis direction. Thus, in the optical system disclosed in the Patent Publication 2, a groove for positioning the second optical fiber cannot be formed on the substrate by anisotropic etching. As a result, the second optical fiber cannot be coupled to the core portion with a high degree of accuracy.

In the optical system disclosed in the Patent Publication 3, since the optical fibers having respective optical axes which obliquely intersect each other are coupled to the core portions which obliquely intersect each other, a length of the optical system in the light-propagating direction can be reduced. However, since the optical waveguide and the substrate are separately made, when the optical fibers are located on the recesses of the substrate, it is difficult to position the optical fibers relative to the core portions of the optical waveguide with a high degree of accuracy.

It is therefore the first object of the present invention to provide an optical system enabling a plurality of optical fibers to be positioned with a high degree of accuracy relative to a plurality of core portions of an optical waveguide which obliquely intersect each other and coupled to the respective optical fibers.

Further, it is the second object of the present invention to provide an optical system in which a length of the optical system in the light-propagating direction can be reduced in a condition that a plurality of core portions which obliquely intersect each other are optically coupled to a plurality of respective optical fibers with a high degree of accuracy, while respective optical axis of a plurality of optical fibers obliquely intersect each other.

Further, it is the third object of the present invention to provide an optical system enabling an optical fiber to be positioned obliquely relative to a crystal axis of a substrate with a high degree of accuracy, and to provide a method of manufacturing an optical system having a groove enabling an optical fiber to be positioned obliquely relative to a crystal axis of a substrate with a high degree of accuracy.

Means for Solving the Problem

To achieve the above-stated first object, an optical system according to the present invention comprises a substrate, and an optical waveguide which is formed on the substrate and to which optical fibers are optically coupled; wherein the optical waveguide has a plurality of straight core portions which obliquely intersect each other, the substrate has positioning sections for positioning a plurality of optical fibers optically coupled to two or more of the plurality of the core portions, the positioning sections having grooves onto which the respective optical fibers are supported, and when the plurality of optical fibers are supported on the respective grooves, offsets between centers of the plurality of the core portions and respective centers of the plurality of the optical fibers coupled to the core portions are equal to or less than 5 µm.

In this optical system of the present invention, the offsets between the centers of the plurality of the core portions which obliquely intersect each other and respective centers of the plurality of the optical fibers coupled to the core portions are equal to or less than 5 µm. In the prior art, when a plurality of optical fibers are optically coupled to a plurality of core portions which obliquely intersect each other, an optical axis of one of the optical fibers corresponding to one of the core portions can be conformed to an crystal axis of the substrate. Thus, by supporting the one of the optical fibers on a V-shaped groove formed in the crystal-axis direction by means of anisotropic etching, an offset between a center of the one of the core portions and a center of the corresponding one of the optical fibers can be equal to or less than 5 µm. However, the other optical fibers coupled to the other core portions have to be disposed obliquely relative to the crystal axis of the substrate. Thus, V-shaped grooves formed by means of anisotropic etching cannot be used for the other optical fibers. As a result, an offset between a center of each of the other core portions and a center of each of the corresponding other optical fibers cannot be equal to or less than 5 µm. On the other hand, in the optical system according to the present invention, the offsets between the centers of the plurality of the core portions and the respective centers of the plurality of the optical fibers can be equal to or less than 5 µm, preferably within a range of 0.3-1.0 µm, by employing embodiments explained later. Namely, positioning a plurality of optical fibers with a high degree of accuracy relative to a plurality of core portions of an optical waveguide which obliquely intersect each other and coupled to the respective core portions can be achieved. Further, since the optical fibers are coupled to the straight core portions which obliquely intersect each other, a length of the optical system in the light-propagating direction can be reduced so that the second object of the present invention can also be achieved.

In an embodiment of the above-stated optical system, preferably, the substrate has a crystal axis, at least one of the optical fibers is obliquely positioned relative to the crystal axis, the groove for the at least one of the optical fibers includes a plurality of sub-grooves respectively formed along a plurality of axes extending in a direction of the crystal axis, and the sub-grooves are continuously disposed and gradually shifted in a direction lateral to the crystal axis so that the sub-grooves are arranged along an optical axis of the at least one of the optical fibers obliquely disposed relative to the crystal axis.

In this optical system, the optical fiber can be positioned relative to the core portion with a high degree of accuracy by supporting the optical fiber obliquely relative to a crystal-axis direction on a plurality of sub-grooves formed along the crystal axis by means of anisotropic etching. Thus, the offsets between the centers of the plurality of the core portions and the respective centers of the plurality of the optical fibers can be equal to or less than 5 µm, preferably within a range of 0.3-1.0 µm.

In an embodiment of the optical system, preferably, the plurality of sub-grooves are simultaneously formed by means of anisotropic etching by using a mask having straight contour lines opposing each other and extending parallel to the optical axis of the optical fiber positioned on the plurality of the sub-grooves.

Further, in the embodiment of this optical system, preferably, the grooves are formed along optical axes of the optical fibers supported on the grooves by means of molding by using a mold.

In this optical system, a combination of a glass substrate or a resin substrate and a molding process enables the groove to be formed with a high degree of accuracy along an optical axis of the optical fiber corresponding to the groove. Thus, the offsets between the centers of the plurality of the core portions and the respective centers of the plurality of the optical fibers can be equal to or less than 5 µm, preferably within a range of 0.3-1.0 µm.

In the embodiment of this optical system, preferably, the substrate is a glass substrate or a resin substrate.

Further, to achieve the above-stated first object, an optical system according to the present invention comprises a substrate, and an optical waveguide which is formed onto the substrate and to which optical fibers are optically coupled; wherein the optical waveguide has a plurality of straight core portions which obliquely intersect each other, the substrate has a crystal axis and positioning sections for positioning a plurality of optical fibers optically coupled to two or more of the plurality of core portions, the positioning sections having grooves onto which the respective optical fibers are supported, at least one of the optical fibers is obliquely positioned relative to the crystal axis, the grooves includes at least two sub-grooves for supporting the at least one of the optical fibers at least two locations, the at least two sub-grooves are formed along respective axes extending in a crystal-axis direction and shifted from each other both in the crystal-axis direction and in a direction perpendicular to the crystal-axis direction, and the substrate has a recess for preventing the optical fiber positioned on the at least two sub-grooves from contacting the substrate between the at least two sub-grooves.

In this optical system, the optical fiber is positioned obliquely relative to the crystal-axis direction by using at least two sub-grooves formed in the optical-axis direction by means of anisotropic etching and supporting the optical fiber at least two locations. Further, the recess between the sub-grooves prevents the optical fiber from contacting the substrate between the sub-grooves. Thus, the optical fiber can be positioned relative to the core portion with a high degree of accuracy. Further, since the optical fibers are coupled to the straight core portions which obliquely intersect each other, a length of the optical system in the light-propagating direction can be reduced so that the second object of the present invention can also be achieved.

In an embodiment of this optical system, preferably, a depth of the recess is larger than that of the sub-grooves.

In an embodiment of this optical system, preferably, when the plurality of optical fibers are supported on the respective grooves, offsets between centers of the plurality of the core portions and respective centers of the plurality of the optical fibers coupled to the core portions are within a range of 0.3-1.0 μm.

To achieve the above-stated second object of the present invention, an optical system according to the present invention comprises a substrate; and an optical waveguide which is formed on the substrate and to which optical fibers are optically coupled; wherein the optical waveguide has an end surface and a plurality of straight core portions intersected with each other, each core portion extending from the end surface obliquely relative to a light-propagating direction at an intersecting angle θ, the substrate has a plurality of positioning sections for positioning a plurality of optical fibers optically coupled to two or more of the plurality of core portions, the positioning sections having grooves for supporting respective optical fibers, a turn-back length which is a distance in the light-propagating direction between the end surface of the optical waveguide and a location where the core portions intersect each other is within a range from a to 2*a, when tips of the optical fibers are obliquely cut at the intersecting angle θ, a is calculated by the following equation (1);

$$a = d/2 * 1/\sin\theta \qquad \text{equation (1),}$$

when tips of the optical fibers are perpendicularly cut, a is calculated by the following equation (2);

$$a = d/2 * 1/\sin\theta - d*\sin\theta \qquad \text{equation (2), and}$$

d indicates an outer diameter of the optical fibers.

In this optical system of the present invention, the plurality of the core portions which obliquely intersect each other are optically coupled to a plurality of optical fibers, while the optical axes of the optical fibers obliquely intersect each other. Further, a turn-back length which is a distance in the light-propagating direction between the end surface of the optical waveguide and a location where the core portions intersect each other is within a range from a to 2*a. In the prior art, when a plurality of optical fibers are optically coupled to a plurality of core portions which obliquely intersect each other, one of the optical fibers can be optically coupled to a corresponding one of the core portions by using a V-shaped groove formed in the crystal-axis direction by means of anisotropic etching with a high degree of accuracy. However, an optical axis of each of the other optical fibers coupled to each of the other core portions has to be disposed obliquely relative to the crystal axis of the substrate. Thus, for each of the other optical fibers, a V-shaped groove formed by means of anisotropic etching cannot be used. As a result, an offset between a center of each of the other core portions and a center of each of the corresponding other optical fibers cannot be equal to or less than 5 μm. On the other hand, in the optical system according to the present invention, by employing embodiments explained later, the turn-back length can be within a range from a to 2*a in a condition that the plurality of the core portions which obliquely intersect each other are optically coupled to a plurality of optical fibers with a high degree of accuracy, while the optical axes of the optical fibers obliquely intersect each other. Thus, a length of the optical system in the light-propagating direction can be reduced.

In an embodiment of this optical system, preferably, the substrate has a crystal axis, at least one of the optical fibers is positioned obliquely relative to the optical axis, the grooves includes at least two sub-grooves for supporting the at least one of the optical fibers at least two locations, the at least two sub-grooves are formed along respective axes extending in a crystal-axis direction and shifted from each other both in the crystal-axis direction and in a direction perpendicular to the crystal-axis direction, and the substrate has a recess for preventing the optical fiber disposed on the at least two sub-grooves from contacting the substrate between the at least two sub-grooves.

In this optical system, the optical fiber is positioned obliquely relative to the crystal-axis direction by using at least two sub-grooves formed in the optical-axis direction by means of anisotropic etching and supporting the optical fiber at least two locations. Thus, a turn-back length can be within a range from a to 2*a in a condition that the plurality of the core portions which obliquely intersect each other are optically coupled to the plurality of optical fibers with a high degree of accuracy, while the optical axes of the optical fibers obliquely intersect with each other.

In an embodiment of the optical system, preferably, a depth of the recess is larger than that of the sub-grooves.

In an embodiment of the optical system, preferably, the substrate has a crystal axis, at least one of the optical fibers is positioned obliquely relative to the optical axis, the grooves include a plurality of sub-grooves respectively formed along a plurality of axes extending in a crystal-axis direction, and the plurality of sub-grooves are continuously disposed and gradually shifted in a direction lateral to the crystal axis so that the sub-grooves are arranged along an optical axis of the at least one of the optical fibers obliquely disposed relative to the crystal axis.

In this optical system, the optical fiber is positioned and supported obliquely relative to the crystal-axis direction by using a plurality of V-shaped sub-grooves formed in the optical-axis direction by means of anisotropic etching. Thus, a turn-back length can be within a range from a to 2*a in a condition that the plurality of the core portions which obliquely intersect each other are optically coupled to the plurality of optical fibers with a high degree of accuracy, while the optical axes of the optical fibers obliquely intersect each other.

In an embodiment of the optical system, preferably, the plurality of grooves are simultaneously formed by means of anisotropic etching by using a mask having straight contour lines opposing each other and extending parallel to the optical axis of the optical fiber positioned on the grooves.

In an embodiment of the optical system, preferably, each of the grooves is formed along an optical axis of the optical fiber supported by the groove by means of molding by using a mold.

In this optical system, a combination of a substrate and a molding process enables the groove to be formed along the optical axis of the optical fiber corresponding to the groove with a high degree of accuracy. Thus, a turn-back length can be within a range from a to 2*a in a condition that the plurality of the core portions which obliquely intersect each other are optically coupled to the plurality of optical fibers with a high degree of accuracy, while the optical axes of the optical fibers obliquely intersect each other.

In an embodiment of this optical system, preferably, the substrate is a glass substrate or a resin substrate.

In an embodiment of this optical system, preferably, each of the grooves is formed so that an extended line of a centerline of each of the core portions conforms to a centerline of the optical fiber optically coupled to the core portion. In this embodiment, more preferably, when the plurality of optical fibers are supported on the grooves, offsets between centers of the plurality of core portions and centers of the respective optical fibers optically coupled to the core portions are equal to or less than 5 µm, preferably, within a range of 0.3-1.0 µm.

Further, in all the above-stated embodiments, preferably, each of the grooves has a cross section in a form of a V-shape or inverted trapezoid.

To achieve the above-stated third object, an optical system according to the present invention comprises a substrate having a crystal axis, and an optical element mounted onto the substrate; wherein the substrate has a first positioning section for positioning a first optical fiber onto the substrate obliquely relative to the crystal axis in order to optically couple the first optical fiber to the optical element, the first positioning section includes at least two first sub-grooves for supporting the first optical fiber at least two locations, the at least two first sub-grooves are formed along respective axes extending in a crystal-axis direction and shifted from each other both in the crystal-axis direction and in a direction perpendicular to the crystal-axis direction, and the substrate has a first recess for preventing the first optical fiber positioned on the at least two first sub-grooves from contacting the substrate between the at least two first sub-grooves.

In this optical system of the present invention, when the first optical fiber is obliquely positioned relative to the crystal-axis of the substrate, the first optical fiber can be positioned relative to the optical element with a high degree of accuracy. In the prior art, when an optical fiber is positioned by using a V-shaped groove formed by means of anisotropic etching, the optical fiber has to be positioned in a crystal-axis direction or a direction perpendicular to the crystal-axis direction. On the other hand, in the optical system according to the present invention, the first optical fiber obliquely disposed relative to the crystal axis can be positioned relative to the optical element with a high degree of accuracy by using at least two first sub-grooves formed in the crystal-axis direction by means of anisotropic etching and supporting the first optical fiber onto the at least two first sub grooves at least two locations. Please note that the above term "first" and the below term "second" are only used to distinguish the sub-grooves of the above embodiment from those of another embodiment explained later. Namely, a second optical fiber may not be provided in this embodiment.

In an embodiment of this optical system, preferably, a depth of the first recess is larger than that of the first sub-grooves.

Further, in the embodiment of this optical system, preferably, each of the first sub-grooves has a cross section in a V-shaped form or in an inverted-trapezoid form. The inverted-trapezoidal form means a trapezoid which has a lower base and an upper base longer than the lower base.

Further, the embodiment of this optical system, preferably, further comprises a second positioning section for positioning a second optical fiber on the substrate, the second optical fiber being optically coupled to the optical element, wherein the second positioning section has a second groove for supporting the second optical fiber so that an extended line of an optical axis of the second optical fiber obliquely intersects an extended line of an optical axis of the first optical fiber positioned by the first positioning section.

In this optical system of the present invention, when the optical axis of the first optical fiber is intersected with the optical axis of the second optical fiber, the first and second optical fibers can be positioned relative to the optical element with a high degree of accuracy. In this connection, the optical element coupled to the first optical fiber may be the same as or different from the optical element coupled to the second optical fiber. In the prior art, when the optical axis of the first optical fiber intersects the optical axis of the second optical fiber, one of the optical fibers can be positioned along the optical axis with a high degree of accuracy by using a V-shaped groove formed in the optical-axis direction by means of anisotropic etching; instead since the optical axis of the other optical fibers is oblique relative to the crystal-axis direction, the other optical fiber cannot be positioned by such a V-shaped groove formed by means of anisotropic etching. On the other hand, in the optical system according to the present invention, the optical fiber obliquely disposed relative to the crystal axis can be positioned relative to the optical element with a high degree of accuracy as stated before.

In this embodiment, preferably, the second groove includes at least two second sub-grooves for supporting the second optical fiber at least two locations, the at least two second sub-grooves are formed along respective axes extending in the crystal-axis direction and shifted from each other both in the crystal-axis direction and in a direction perpendicular to the crystal-axis direction, and the substrate has a second recess for preventing the second optical fiber positioned on the at least two second sub-grooves from contacting the substrate between the at least two second sub-grooves.

In this optical system, when both of the optical axes of the first and second optical fiber are oblique relative to the optical-axis direction of the substrate, the first and second optical fibers can be positioned relative to the optical element with a high degree of accuracy.

In an embodiment of the optical system, preferably, a depth of the second recess is larger than that of the second sub-grooves.

In the optical system, preferably, the optical element is an optical waveguide or a lens laminated on the substrate.

Further, in the above-stated embodiment in which the first and second optical fibers are positioned, preferably, the optical element is an optical waveguide laminated on the substrate, the optical waveguide has a first core portion optically coupled to the first optical fiber, and a second core portion optically coupled to the second optical fiber, and an optical-filter mounting means for mounting an optical filter is provided at a location where the first core portion and the second core portion intersect.

In this embodiment, preferably, the first sub-grooves are formed so that an extended line of a centerline of the first core portion conforms to an extended line of a centerline of the first optical fiber optically coupled to the first core portion, and the second groove is formed so that an extended line of a centerline of the second core portion conforms to an extended line of a centerline of the second optical fiber optically coupled to the second core portion.

Further, to achieve the above-stated third object, a method of manufacturing an optical system according to the present invention, the optical system having a groove for positioning an optical fiber onto a substrate, the optical fiber being optically coupled to an optical element on the substrate, comprises the steps of providing a substrate having a crystal axis; mounting an optical element onto the substrate; and forming a groove for positioning the optical fiber on the substrate obliquely relative to the crystal axis by means of anisotropic etching for optically coupling the optical fiber to the optical element; wherein the step of forming the groove by means of anisotropic etching comprises a step of using a mask having straight contour lines opposing each other and extending parallel to the optical fiber, and an etching solution modified so that differences between process rates on crystal surfaces of the substrate to be etched are reduced, to form the groove which has side surfaces extending in the same direction as a direction in which the optical fiber extends.

In this method according to the present invention, unlike the prior method in which a groove is formed in a crystal-axis direction by means of anisotropic etching, a groove can be formed obliquely relative to the crystal axis by means of anisotropic etching. Specifically, the prior anisotropic etching utilizes a large difference between processing (etching) rates at respective crystal surfaces of a substrate to be etched. Said respective crystal surfaces means surfaces each including a diagonal line of a cubic of a crystal unit cell in a single crystal structure. Even if a groove for an optical fiber is intended to be formed obliquely relative to a crystal axis, in the prior art method, etching would not be performed along a surface extending in the same direction as that of the optical fiber; instead etching would be performed along the crystal surfaces at respective different processing rates so that a groove would be formed along the crystal axis. For example, even if a mask having straight contour lines opposing each other and extending parallel to the optical fiber is used, an excess amount of side etching would be caused so that a groove extending in the same direction as that of the optical fiber, namely, a groove extending obliquely relative to the crystal axis, could not be formed. However, the inventor of the present invention has formed a groove extending oblique relative to the crystal axis with a high degree of accuracy by using a mask having straight contour lines opposing each other and extending parallel to the optical fiber and an etching solution modified so that a difference between processing rates at respective crystal surfaces of the substrate to be etched is made small for etching the substrate so as to reduce or restrict an excess amount of side etching. As a result, by mounting an optical fiber on the groove, the optical fiber can be positioned on the substrate with a high degree of accuracy.

As explained above, an optical system according to the present invention enables a plurality of optical fibers to be positioned with a high degree of accuracy relative to a plurality of core portions of an optical waveguide which obliquely intersect each other and coupled to the respective optical fibers.

Further, in an optical system according to the present invention, a length of the optical system in the light-propagating direction can be reduced in a condition that a plurality of core portions which obliquely intersect each other are optically coupled to a plurality of optical fibers with a high degree of accuracy, while respective optical axis of the plurality of optical fibers obliquely intersect each other.

Further, in an optical system and a method of manufacturing the same according to the present invention, an optical fiber can be obliquely positioned relative to a crystal axis of a substrate with a high degree of accuracy.

DETAILED DESCRIPTION OF THE PREFERRED EMBODIMENTS

Now, referring to drawings, embodiments of an optical system according to the present invention will be explained.

Figure 1:
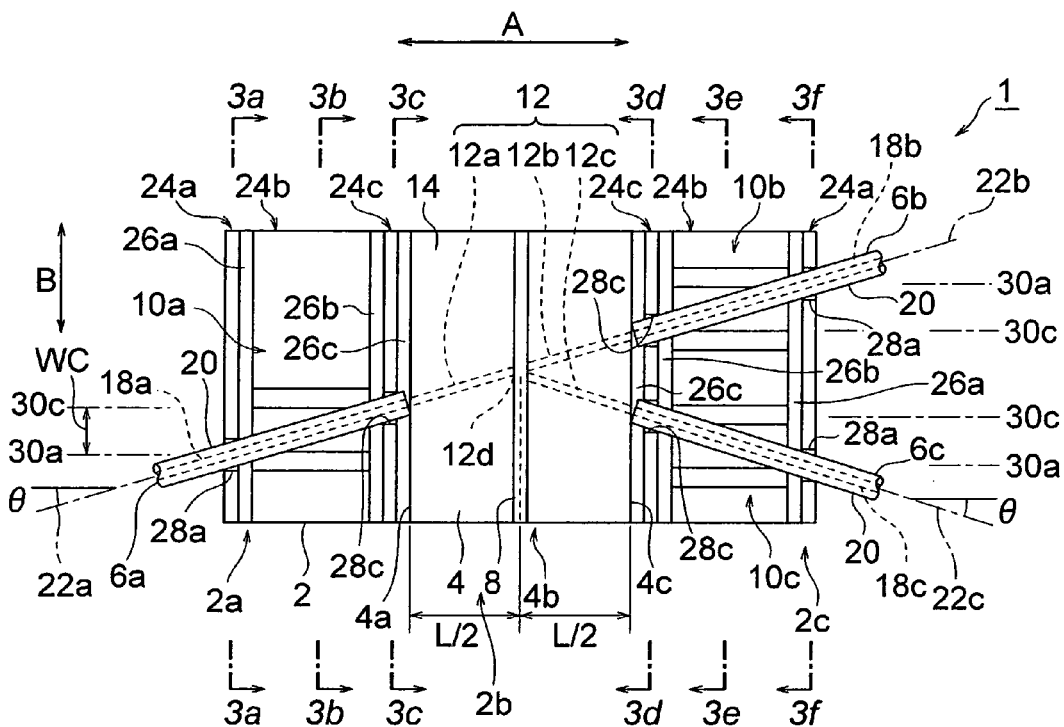
FIG. 1 is a plan view of an optical multiplexer according to the first embodiment of the present invention.
Figure 2:
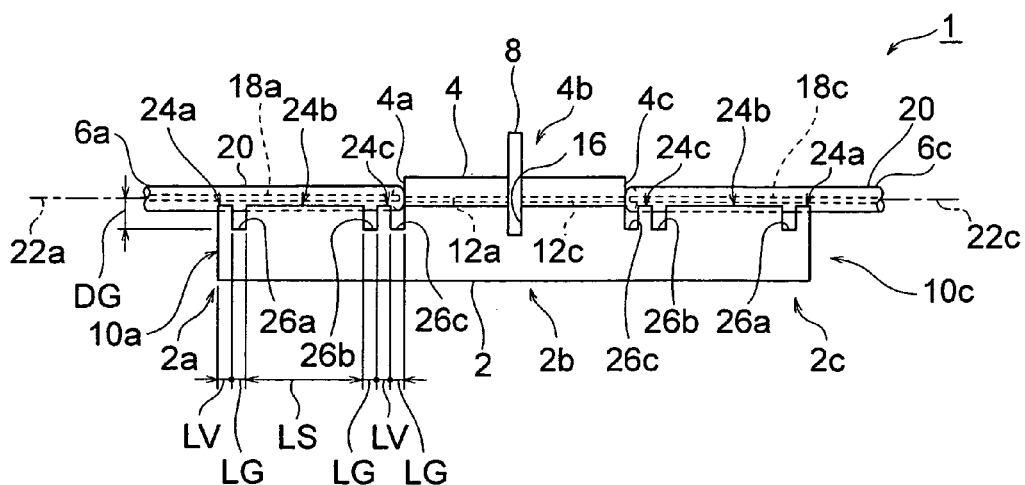
FIG. 2 is a front view of the optical multiplexer shown in FIG. 1.

Firstly, referring to FIGS. 1, 2 and 3a-3f, an optical multiplexer which is a first embodiment of the optical system according to the present invention will be explained. FIG. 1 is a plan view of the optical multiplexer which is the first embodiment according to the present invention. FIG. 2 is a front view of the optical multiplexer shown in FIG. 1. FIGS. 3a-3f are respective cross-sectional views along the lines 3a-3a to 3f-3f shown in FIG. 1.

As shown in FIGS. 1 and 2, the first embodiment optical multiplexer 1 has a substrate 2, an optical waveguide 4 which is an optical element mounted on the substrate 2, three optical fibers 6a, 6b, 6c coupled to the optical waveguide 4, and an optical filter 8 disposed in an intermediate location 4b of the optical waveguide 4. The optical waveguide 4 is concretely laminated onto the substrate 2.

The substrate 2 extends in an light-propagating direction A, the optical waveguide 4 is laminated onto an intermediate section 2b of the substrate 2, and optical fiber support sections 10a, 10b, 10c for supporting the respective optical fibers 6a, 6b, 6c are provided at opposed ends 2a, 2c of the substrate 2. The substrate 2 also extends in a perpendicular or width direction B perpendicular to the light-propagating direction A. The substrate 2 is formed of a material having a crystal axis, for example, an organic material such as silicon, enabling the substrate 2 to be anisotropic etched. In the optical multiplexer 1, a direction of the crystal axis or a crystal-axis direction of the substrate 2 conforms to the light-propagating direction A.

The optical waveguide 4 has a core 12 and a cladding 14, and the core 12 includes a plurality of core portions 12a, 12b, 12c which obliquely intersect each other at an intersection 12d. Concretely, in the optical multiplexer 1, there are a first core portion 12a extending straightly from one end surface 4a to the intermediate location 4b of the waveguide 4 and extending obliquely relative to the light-propagating direction A at an intersecting angle θ, a second core portion 12b extending straightly from the intermediate location 4b to the other end surface 4c of the waveguide 4 and aligned with the first core portion 12a, and a third core portion 12c extending straightly from the intermediate location 4b to the other end surface 4c and extending obliquely relative to the light-propagating direction A at the intersecting angle θ so as to obliquely intersect the first and second core portions 12a, 12b with each other.

The substrate 2 and the optical waveguide 4 are formed with an optical filter mounting groove 16 which is an optical filter mounting means for mounting the optical filter 8 extending across the intermediate location 4d of the optical waveguide 4, and the optical filter 8 is fixed in the optical filter mounting groove 16 by means of an adhesive. The optical filter 8 is, for example, a dielectric multilayer film filter which can transmit a light having a first wavelength λ1 (for example, 1310 nm) and a light having a second wavelength λ2 (for example, 1490 nm) and reflect a light having a third wavelength λ3 (for example, 1550 nm).

The optical fibers 6a, 6b, 6c are single mode optical fibers optically coupled to the respective core portions 12a, 12b, 12c of the optical waveguide 4, and have respective cores 18a, 18b, 18c, respective claddings 20, and respective optical axes or centerlines 22a, 22b, 22c. In the optical multiplexer 1, the optical axis 22a conforms to the optical axis 22b. An outer diameter of each of the optical fibers 6a, 6b, 6c is typically 125 μm.

The optical fiber support section 10a for supporting the optical fiber 6a is provided with V-shaped groove support portions 24a, 24c spaced from each other in the light-propagating direction A and a separating portion 24b disposed between the V-shaped groove support portions 24a, 24c for separating the substrate 2 from the optical fiber 6a. Further, grooves 26a, 26b, 26c extending in the width direction B are respectively formed between the V-shaped groove support portion 24a and the separating portion 24b, between the separating portion 24b and the V-shaped groove support portion 24c, and between the V-shaped groove support portion 24c and the optical waveguide 4.

Figure 3A:
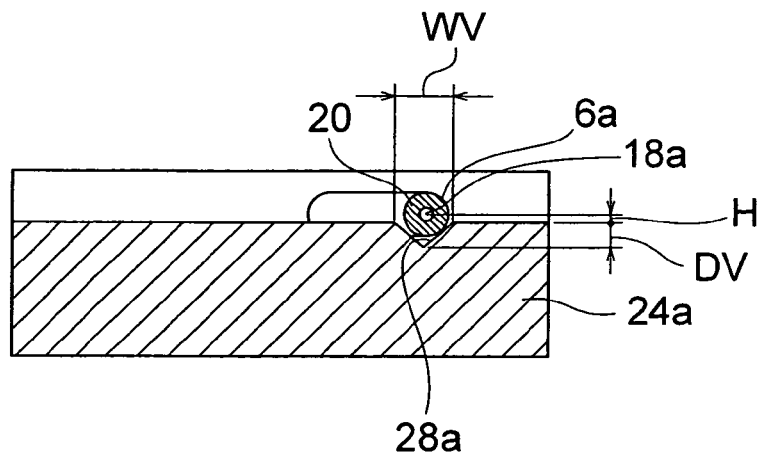
FIG. 3a is a cross-sectional view along the line 3a-3a shown in FIG. 1.
Figure 3B:
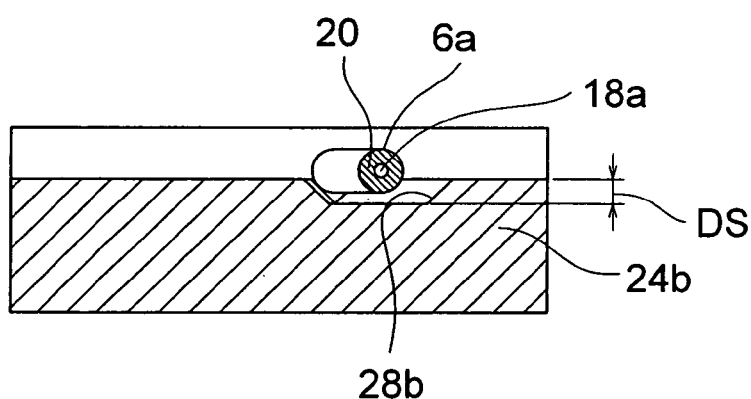
FIG. 3b is a cross-sectional view along the line 3b-3b shown in FIG. 1.
Figure 3C:
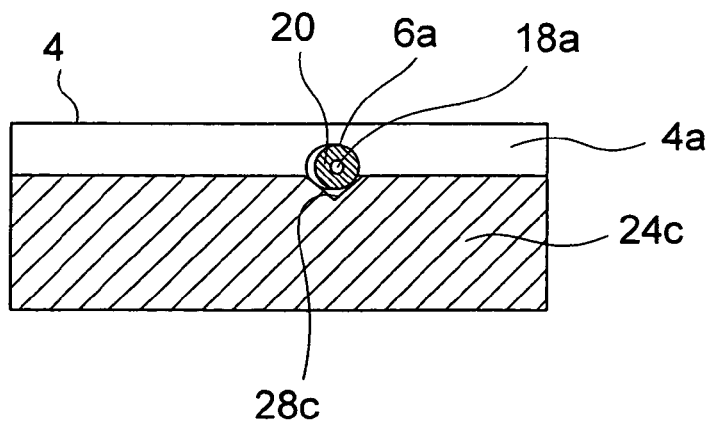
FIG. 3c is a cross-sectional view along the line 3c-3c shown in FIG. 1.
Figure 3D:
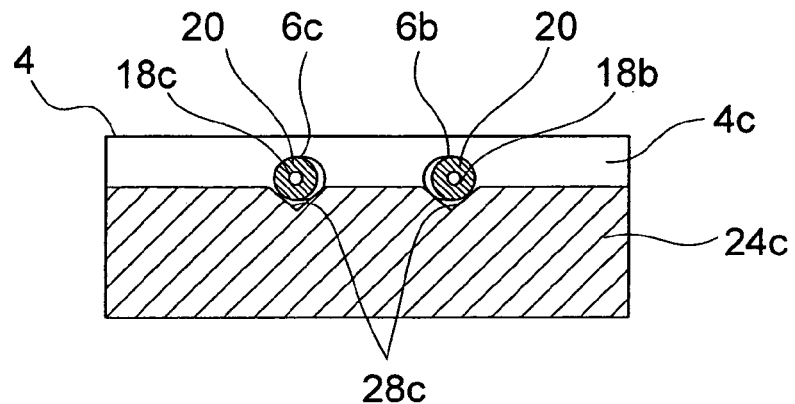
FIG. 3d is a cross-sectional view along the line 3d-3d shown in FIG. 1.
Figure 3E:
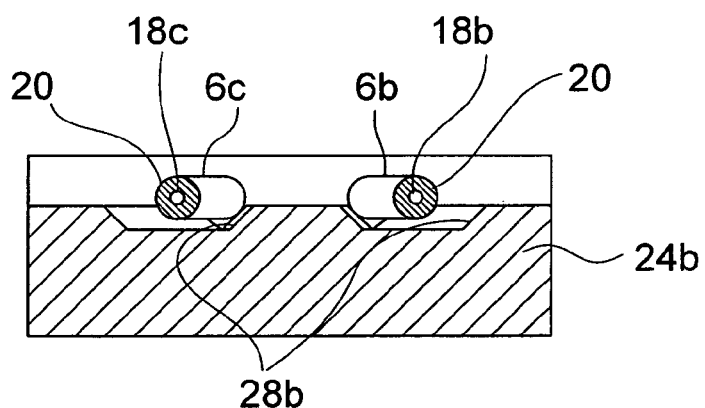
FIG. 3e is a cross-sectional view along the line 3e-3e shown in FIG. 1.
Figure 3F:
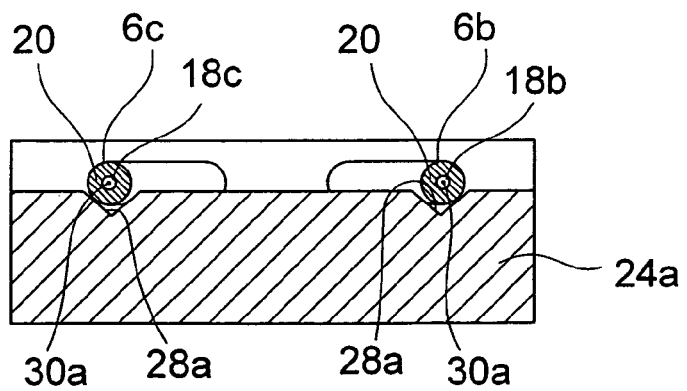
FIG. 3f is a cross-sectional view along the line 3f-3f shown in FIG. 1.

Specifically, as shown in FIGS. 3a-3c, the V-shaped groove support portions 24a, 24c are respectively formed with V-shaped sub-grooves 28a, 28c, each sub-groove 28a, 28c being formed in the crystal-axis direction by means of anisotropic etching and having a V-shaped cross section. The V-shaped sub-grooves 28a, 28c have respective axes 30a, 30c, each axis extending in the crystal-axis direction or the light-propagating direction A. Locations, widths and depths of the V-shaped sub-grooves 28a, 28c are determined so that the optical axis 22a of the optical fiber 6a positioned on the V-shaped sub-grooves 28a, 28b is aligned with the centerline of the first core portion 12a of the optical waveguide 4 and an extended line of said centerline with a submicron-degree of accuracy. Thus, the location of the V-shaped sub-groove 28a is different from that of the V-shaped sub-groove 28c in the width direction B, and the optical axis 22a of the optical fiber 6a is obliquely disposed relative to the axes 30a, 30c of the V-shaped sub-grooves 28a, 28c. Further, as shown in FIG. 3b, the separating portion 24b has a recess 28b formed by means of anisotropic etching and having an inverted-trapezoidal cross section. Thus, the recess 28b and the grooves 26a, 26b define a depressed area for preventing the optical fiber 6a positioned on the V-shaped sub-grooves 28a, 28c from contacting the substrate 2 between the grooves 26a, 26b.

A depth DS of the recess 28b and a depth DG of each of the grooves 26a, 26b are preferably larger than a depth DV of each of the V-shaped sub-grooves 28a, 28c (Please refer to FIGS. 2 and 3.) When the depths DS, DG are larger than the depth DV, an offset between a center of the core portion 12a of the optical waveguide 4 and a center of the core 18a of the optical fiber 6a can be made small.

For example, in the light-propagating direction A, a length LV of each of the V-shaped groove support portions 24a, 24c is within a range of 20-400 μm, a length LS of the separating portion 24b is within a range of 100-1200 μm, and a length LG of each of the grooves 26a, 26b, 26c is within a range of 50-250 μm (Please refer to FIG. 2).

In a concrete example, when the intersecting angle θ is 8 degrees, a width WV of each of the V-shaped sub-grooves 28a, 28c of the V-shaped groove support portions 24a, 24c is 150 μm, and a height H from the substrate 2 to each of the centers of the optical fibers 6a, 6b, 6c is 11 μm (Please refer to FIG. 3a), the length LV of each of the V-shaped support portions 24a, 24c in the light-propagating direction A is 82 μm (Please refer to FIG. 2). Further, in the light-propagating direction A, the sum of the length LS of the separating portion 24b and the lengths LG of the grooves 26a, 26b (Please refer to FIG. 2) is determined by a center-to-center sub-groove distance WC between the V-shaped groove support portions 24a, 24c in the perpendicular direction B when the intersecting angle θ is 8 degrees (please refer to FIG. 1) and the lengths LV of the V-shaped groove support portions 24a, 24c in the light-propagating direction A. When the center-to-center sub-groove distance WC is 150 μm, the sum of the length LS of the separating portion 24b and the lengths LG of the grooves 26a, 26b can be calculated by using the following equation; 150/tan θ−82, and is 985 μm. Further, when each of the lengths LG of the grooves 26a, 26c is 150 μm, the length LS of the separating portion 24b can be calculated by using the following equation; 985−150*2, and is 685 μm.

Each of the optical fiber support sections 10b, 10c for respectively supporting the optical fibers 6b, 6c has a structure similar to that of the optical fiber support section 10a. Thus, the same reference numbers as those for the support portion 10a are attached to components of the support portions 10b, 10c similar to those of the support portion 10a, and explanations of the support portions 10b, 10c are omitted.

Next, an example of a method of manufacturing the optical system will be explained.

The substrate 2 made of, for example, organic materials such as silicon, is anisotropic etched by using a resist pattern which is made by means of photolithography to form the V-shaped sub-grooves 28a, 28c and the recess 28b. The anisotropic etching is performed by using strong alkali aqueous solution so that the V-shaped sub-grooves 28a, 28c and the recess 28b are formed along the crystal-axis direction.

Next, the optical waveguide 4 is formed on the intermediate section 2b of the substrate 2. Concretely, when the optical waveguide 4 is formed of a polymer material such as fluorinated polyimide, after a cladding layer is formed by means of spin coating or molding, a core layer on the cladding layer is formed of, for example, fluorinated polyimide, which refractive index is different from that of fluorinated polyimide of the cladding layer. Next, the core 10 having a rectangular cross section is formed in a desired pattern from the core layer by means of a process such as photolithography and RIE (reactive ion etching), or by means of machining process. Next, another cladding layer is formed over the core 10 by using a way similar to that explained above regarding the cladding layer, to form the optical waveguide 4. Further, when the optical waveguide is made of quartz, a quartz layer is formed on the substrate 2 by means of a flame hydrate deposition or CVD, a quartz core 10 having a rectangular cross section is made from the quartz layer by means of a process such as dry etching, and then a cladding layer is formed over the core 10 to form the optical waveguide 4.

The step of forming the V-shaped sub-grooves 28a, 28c and the recess 28b and the step of forming the optical waveguide 4 are performed so that when the optical fibers 6a, 6b, 6c are mounted onto the V-shaped sub-grooves 28a, 28c, the optical fibers 6a, 6b, 6c are respectively positioned relative to the core portions 12a, 12b, 12c of the optical waveguide 4 with a submicron-degree of accuracy.

Next, the grooves 26a, 26b, 26c are formed in order to remove unnecessary inclined surfaces caused by means of anisotropic etching. Further, the optical filter mounting groove 16 is formed.

Preferably, after the above processes are simultaneously performed for a plurality of optical multiplexers 1 on one substrate, each of the multiplexers 1 is individually cut from the substrate.

Next, the optical fibers 6a, 6b, 6c are mounted onto the V-shaped sub-grooves 28a, 28c and respective tips of the optical fibers 6a, 6b, 6c are allowed to contact the optical waveguide 4, and the optical fibers 6a, 6b, 6c are respectively positioned relative to the core portions 12a, 12b, 12c of the optical waveguide 4 and fixed to the substrate 2 by means of an adhesive. Namely, the optical fibers 6a, 6b, 6c can be passively mounted. Next, the optical filter 8 is fixed into the optical filter mounting groove 16 by means of an adhesive.

Next, an operation of the first-embodiment optical multiplexer 1 according to the present invention will be explained.

When a light having the first wavelength $\lambda 2$ is input into the optical fiber 6b, the light is transmitted through the optical filter 8 to the optical fiber 6a. When a light having the first wavelength $\lambda 1$ is input into the optical fiber 6a, the light is transmitted through the optical filter 8 to the optical fiber 6b. When a light having the third wavelength $\lambda 3$ is input into the optical fiber 6b, the light is reflected at the optical filter 8 and transmitted to the optical fiber 6c. When a light having the second wavelength $\lambda 2$ is input into the optical fiber 6b, the light is transmitted through the optical filter 8 to the optical fiber 6a.

Figure 4:
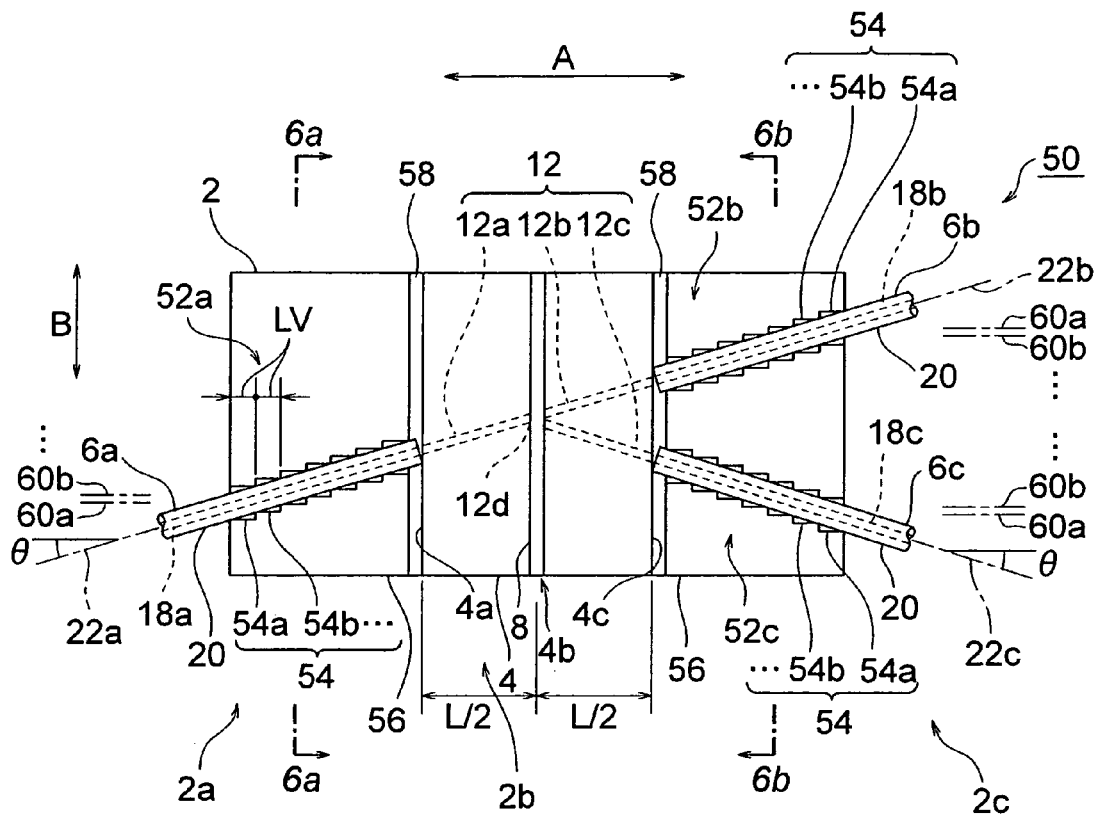
FIG. 4 is a plan view of an optical multiplexer according to the second embodiment of the present invention.
Figure 5:
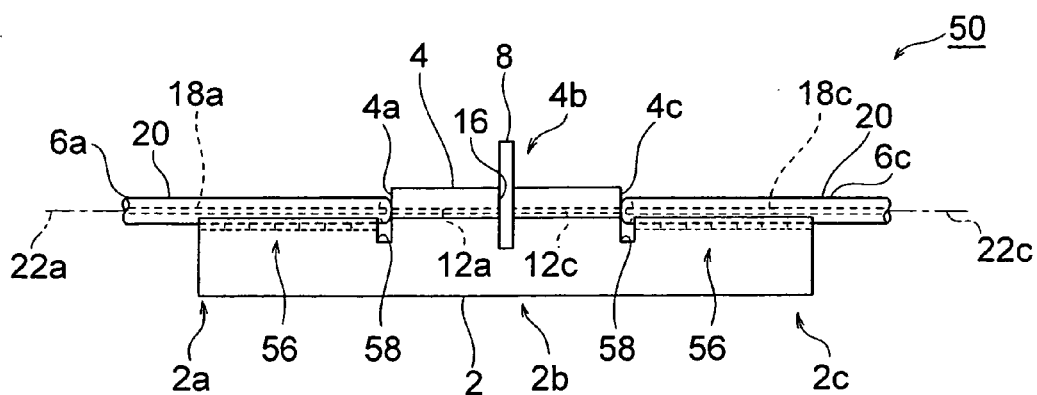
FIG. 5 is a front view of the optical multiplexer shown in FIG. 4.
Figure 6A:
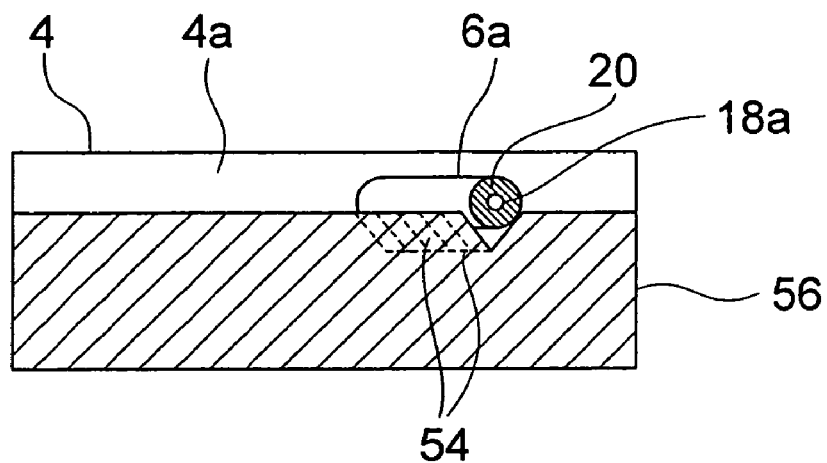
FIG. 6a is a cross-sectional view along the line 6a-6a shown in FIG. 4.
Figure 6B:
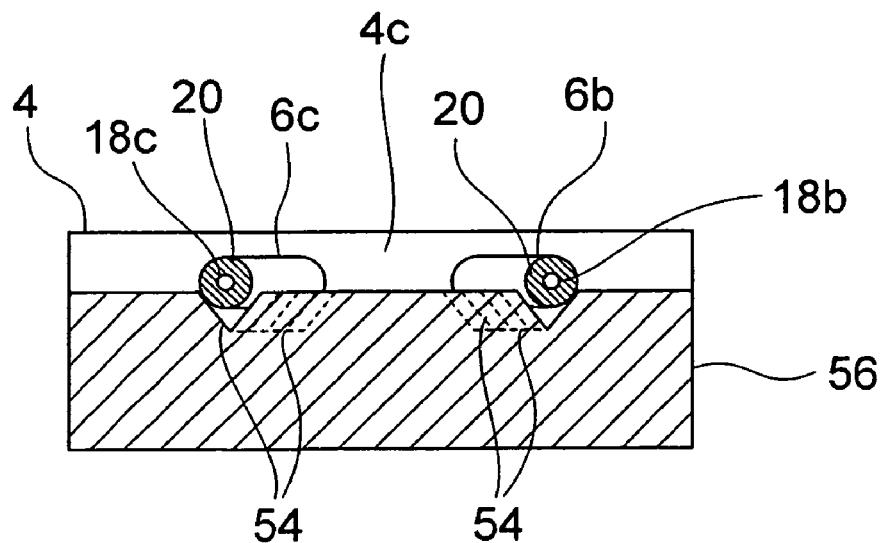
FIG. 6b is a cross-sectional view along the line 6b-6b shown in FIG. 4.

Next, referring to FIGS. 4, 5, 6a and 6b, an optical multiplexer which is a second embodiment of the optical system according to the present invention will be explained. FIG. 4 is a plan view of the multiplexer which is the second embodiment according to the present invention. FIG. 5 is a front view of the optical multiplexer shown in FIG. 4. FIGS. 6a and 6b are respective cross-sectional views along the lines 6a-6a and 6b-6b shown in FIG. 4.

The second embodiment optical multiplexer 50 according to the present invention has an arrangement similar to that of the first embodiment optical multiplexer 1 except for the optical fiber support sections 10a, 10b, 10c. In this connection, the same reference numbers as those in the optical multiplexer 1 are attached to components of the optical multiplexer 50 common to those of the optical multiplexer 1, and an explanation of the components of the former optical multiplexer 50 is omitted.

As shown in FIGS. 4 and 5, optical fiber support sections 52a, 52b, 52c for supporting the optical fibers 6a, 6b, 6c are provided at the opposite ends 2a, 2c of the substrate 2.

The optical fiber support section 52a for supporting the optical fiber 6a' has a V-shaped support portion 56 formed with a V-shaped groove 54 having a V-shaped cross section, and a groove 58 extending between the V-shaped support section 56 and the optical waveguide 4 in the width direction B. Specifically, as shown in FIGS. 4 and 6a, the V-shaped groove 54 consists of a plurality of V-shaped sub-grooves 54a, 54b, . . . formed by means of anisotropic etching along a plurality of respective axes 60a, 60b, . . . extending in the crystal-axis direction, namely, in the light-propagating direction A, and the V-shaped sub-grooves 54a, 54b, . . . are disposed continuously and shifted in the width direction B so that the V-shaped sub-grooves 54a, 54b, . . . are arranged along the optical axis 22a of the optical fiber 6a obliquely positioned relative to the light-propagating direction A. Locations, widths and depths of the V-shaped sub-grooves 54a, 54b, . . . are determined so that the optical fiber 6a mounted on the V-shaped sub-grooves 54a, 54b, . . . is aligned with the first core portion of the optical waveguide 4 with a micron-degree of accuracy. Namely, the optical axis 22a of the optical fiber 6a is obliquely disposed relative to the axes 60a, 60b, . . . of the V-shaped sub-grooves 54a, 54b, . . . . For example, each length LV of the V-shaped sub-grooves 54a, 54b, . . . in the light-propagating direction is equal to or less than 1 μm. This length LV can be measured or confirmed by using a metallographic microscope with a magnification power of 100.

Each of the optical fiber support sections 52b, 52c for respectively supporting the optical fibers 6b, 6c has a structure similar to that of the optical fiber support section 52a. Thus, the same reference numerals as those for the support section 52a are attached to components of each of the support sections 52b, 52c similar to those of the support section 52a, and explanations of the components of the support sections 52b, 52c are omitted.

A manufacturing method and an operation of the second embodiment optical multiplexer 50 are similar to those of the first embodiment optical multiplexer 1, and thus explanations of the manufacturing method and the operation of the second embodiment optical multiplexer 50 are omitted. Please note that the anisotropic etching is performed by using an alkali aqueous solution (etching solution) of, for example, potassium hydroxide, sodium hydroxide, ethylenediamine, tetramethylammonium hydroxide so that the V-shaped sub-grooves 54a, 54b, . . . are formed along the optical axis. A mask for forming the V-shaped sub-grooves 54a, 54b, . . . by means of photolithography may have the same step-like contour as that of the V-shaped sub-grooves 54a, 54b, . . . or have straight contour lines opposing each other and extending parallel to the optical axis 22a of the optical fiber positioned on the V-shaped sub-grooves 54a, 54b, . . . . When the mask having the straight contour lines is used for the anisotropic etching, since the direction of the optical axis 22a of the optical fiber obliquely intersects the direction of the crystal axis, the anisotropic etching is not performed along the straight contour lines of the mask, while it is performed so as to make a step-like contour as shown in FIG. 4.

Figure 7:
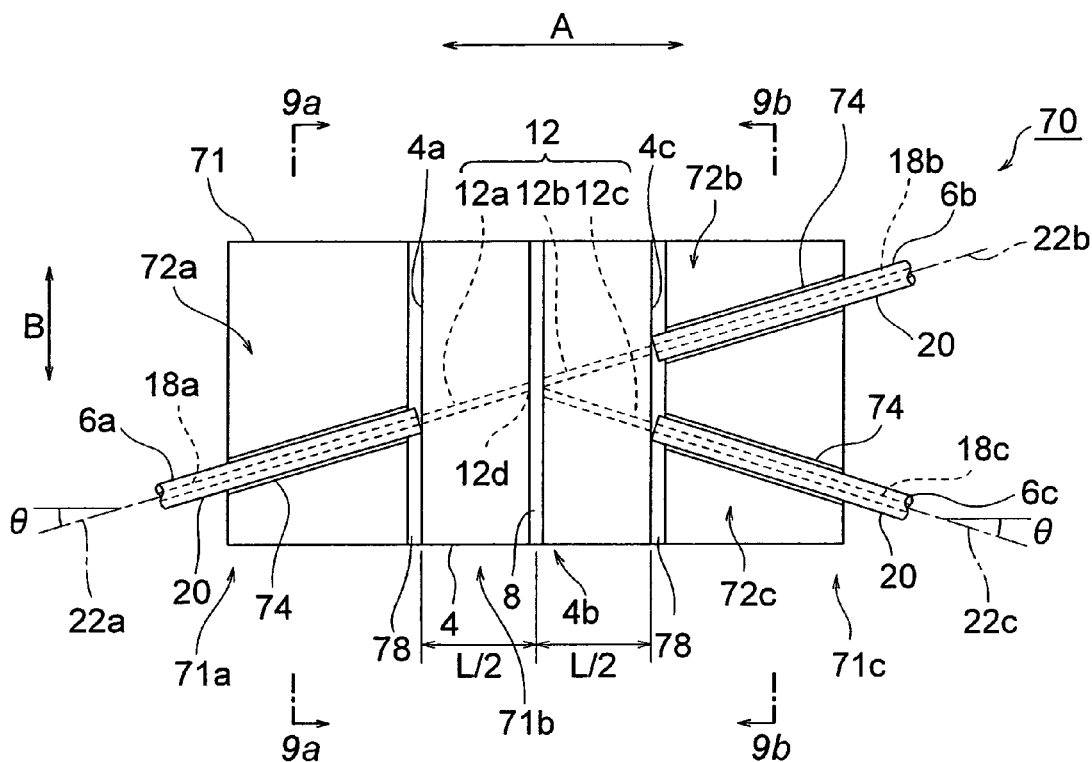
FIG. 7 is a plan view of an optical multiplexer according to the third embodiment of the present invention.
Figure 8:
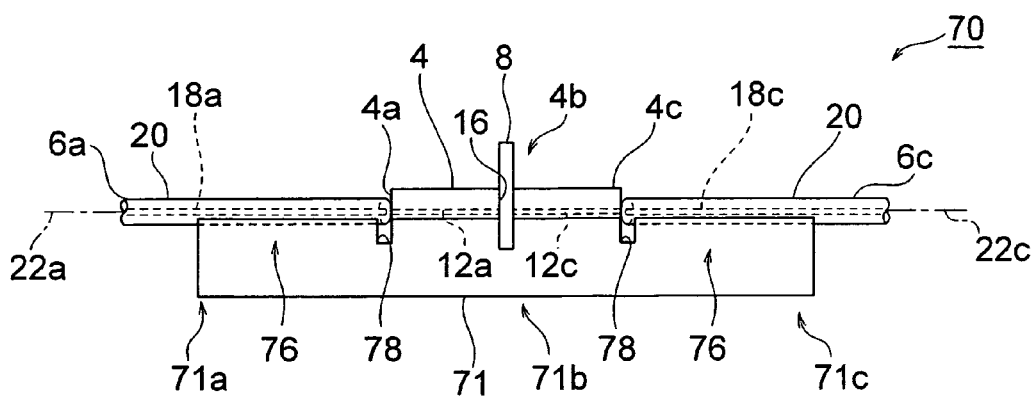
FIG. 8 is a front view of the optical multiplexer shown in FIG. 7.
Figure 9A:
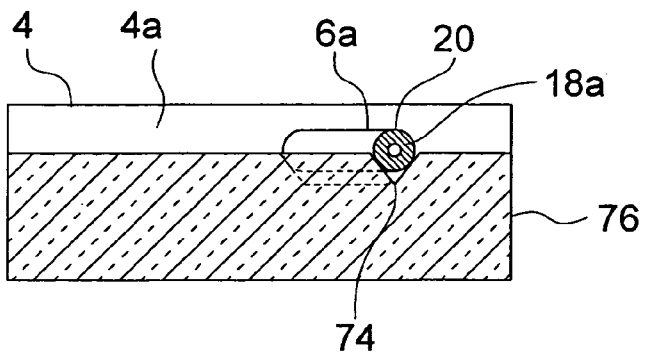
FIG. 9a is a cross-sectional view along the line 9a-9a shown in FIG. 7.
Figure 9B:
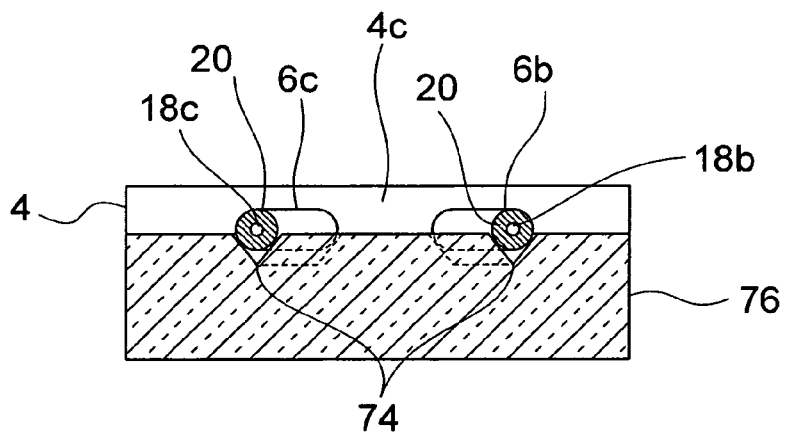
FIG. 9b is a cross-sectional view along the line 9b-9b shown in FIG. 7.

Next, referring to FIGS. 7, 8, 9a and 9b, an optical multiplexer which is a third embodiment of the optical system according to the present invention will be explained. FIG. 7 is a plan view of the optical multiplexer which is the third embodiment optical system according to the present invention. FIG. 8 is a front view of the optical multiplexer shown in FIG. 7. FIGS. 9a and 9b are respectively cross-sectional views along the lines 9a-9a and 9b-9b shown in FIG. 7.

The third embodiment optical multiplexer 70 according to the present invention has an arrangement similar to that of the first embodiment optical multiplexer 1 except for the substrate 2 and the optical fiber support sections 10a, 10b, 10c. In this connection, the same reference numbers as those of the optical multiplexer 1 are attached to components of the optical multiplexer 70 common to those of the optical multiplexer 1, and an explanation of the components of the optical multiplexer 70 is omitted.

As shown in FIGS. 7 and 8, the third embodiment optical multiplexer 70 has a substrate 71, an optical waveguide 4 laminated on the substrate 71, three optical fibers 6a, 6b, 6c coupled to the optical waveguide 4, and an optical filter 8 disposed in the intermediate location 4b of the optical waveguide 4.

The substrate 71 extends in the light-propagating direction A, the optical waveguide 4 is laminated on an intermediate section 71b of the substrate 71, and optical fiber support sections 72a, 72b, 72c for supporting the respective optical fibers 6a, 6b, 6c are provided at the opposed ends 71a, 71c of the substrate 71. The substrate 71 may be a glass substrate, a resin substrate made of a resin such as epoxy, or a substrate made of an organic material such as silicon.

The optical fiber support section 72a for supporting the optical fiber 6a is provided with a V-shaped groove support portion 76 formed with a V-shaped groove 74 having a V-shaped cross section, and a groove 78 extending in the width direction B between the V-shaped groove support portion 76 and the optical waveguide 4. As shown in FIGS. 7 and 9a, the V-shaped groove 74 is formed along the axis 22a of the optical fiber 6a. Locations, widths and depths of the V-shaped groove 74 are determined so that the optical fiber 6a positioned on the V-shaped groove 74 is aligned with the first core portions 12a of the optical waveguide 4 with a submicron-degree of accuracy.

Each of the optical fiber support sections 72b, 72c for respectively supporting the optical fibers 6b, 6c has a structure similar to that of the optical fiber support section 72a. Thus, the same reference numbers as those in c section 72a are attached to components of the support sections 72b, 72c similar to those of the support section 72a, and explanations of the support sections 72b, 72c are omitted.

Figure 10:
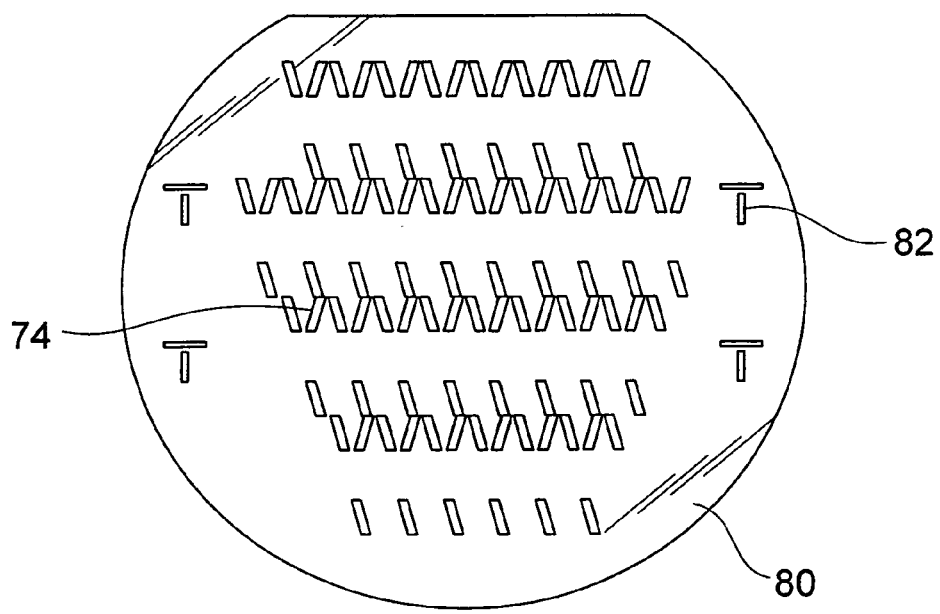
FIG. 10 shows a substrate for forming the optical multiplexer shown in FIG. 7.

Next, referring to FIG. 10, a first example of a method of manufacturing the third embodiment optical multiplexer according to the present invention will be explained. FIG. 10 shows a glass substrate or a resin substrate after the V-shaped grooves 74 are formed.

As shown in FIG. 10, a step is performed of molding the glass substrate or the resin substrate 80 by using high-grade-precision processing molds to form the V-shaped grooves 74 and V-shaped positioning grooves 82 used to form the waveguides 4 in a later step.

Later steps performed after the above step are similar to those of the manufacturing method of the first embodiment optical multiplexer 1 except that the later steps are performed by using the V-shaped positioning groove 82 as a base, and thus an explanation of the later steps is omitted.

Next, a second example of the manufacturing method of the third embodiment optical multiplexer according to the present invention will be explained. In this case, FIG. 10 shows a substrate having a crystal axis, for example, a silicon substrate, after the V-shaped grooves 74 are formed.

The second example of the manufacturing method of the third embodiment optical multiplexer 70 is similar to the manufacturing method of the second embodiment optical multiplexer 50 except for the etching solution. Thus, only the etching solution for the second-example manufacturing method will be explained. The etching solution used therefor is modified so that a difference between processing rates at respective crystal surfaces of the substrate to be etched is made small, and is preferably an alcohol-added aqueous solution made by adding alcohol to alkali aqueous solution such as potassium hydroxide, sodium hydroxide, ethylenediamine, or tetramethylammonium hydroxide. Although side etching rates at the respective crystal surfaces are considerably different from each other when a strong alkali aqueous solution is used for etching, the difference between the processing rates can be made small by using the above-stated etching solution, so that an excess amount of side etching relative to the mask can be reduced and the side etching rate can be reduced from about 0.5 μm/minute conventionally caused by using the strong alkali aqueous solution, to 0.05-0.2 μm/minute. Thus, by selecting an appropriate etching mask and an appropriate etching time, the V-shaped grooves 74 obliquely extending relative to the crystal axis can be formed with a high degree of accuracy. The etching mask preferably extends parallel to the optical axis of the optical fiber positioned on the V-shaped groove and has straight contour lines opposing each other.

An operation of the third embodiment optical multiplexer 70 is similar to that of the first embodiment multiplexer 1, and thus an explanation of the operation of the optical multiplexer 70 is omitted.

Next, a result of measuring an optical property of an optical multiplexer will be explained, the optical multiplexer having a silicon substrate formed with the V-shaped groove made by means of the above-stated second example method in which the etching is performed at 70° C. by using, as an etching solution, a potassium hydroxide aqueous solution to which isopropyl alcohol is added (the solution is made by mixing isopropyl alcohol with a potassium hydroxide aqueous solution to form a supersaturation state and has a side etching rate of 0.1 μm/minute). As the optical property, amounts of lights transmitted to the respective optical fibers 6b, 6c are measured when a light having a wavelength of 1310 nm is input into the optical fiber 6a. Further, amounts of light transmitted to the respective optical fibers 6a, 6c are measured when a light having a wavelength of 1490 nm is input into the optical fiber 6b. Further, amounts of light transmitted to the respective optical fibers 6a, 6c are measured when a light having a wavelength 1550 nm is input into the optical fiber 6b. A Fabry-Perot laser is used as a light source for the lights having respective wavelengths of 1490 nm and 1310 nm, while a DFB laser is used as the same for the light having a wavelength of 1550 nm. Table 1 shows an insertion loss and a crosstalk under these conditions. The insertion loss regarding the wavelength of 1310 nm indicates an amount of light transmitted to the optical fiber 6b, the same regarding the wavelength of 1490 nm indicates an amount of light transmitted to the optical fiber 6a, and the same regarding the wavelength of 1550 nm indicates an amount of light transmitted to the optical fiber 6c. The crosstalk indicates an amount of light transmitted to the remaining optical fibers. The insertion loss and the crosstalk indicate a good property as shown in FIG. 1.

TABLE 1

| items | 1310 nm (wavelength) | 1490 nm (wavelength) | 1550 nm (wavelength) |
|---|---|---|---|
| Insertion loss (dB) | 0.5 | 0.6 | 0.6 |
| Crosstalk (dB) | −46 | −32 | −33 |

Figure 11:
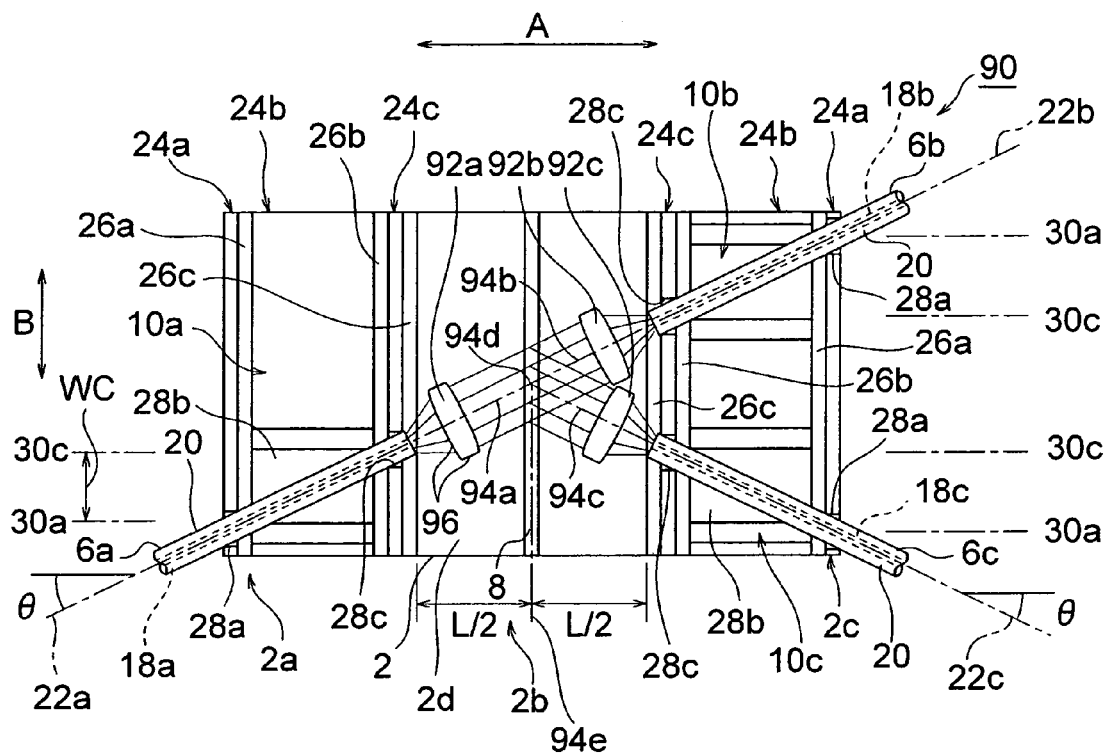
FIG. 11 is a plan view of an optical multiplexer according to the fourth embodiment of the present invention.
Figure 12:
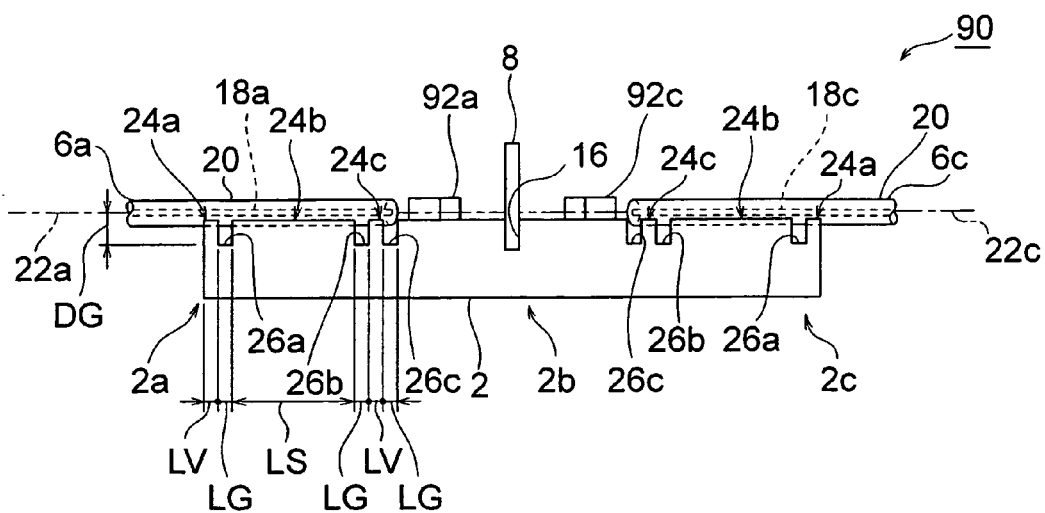
FIG. 12 is a front view of the optical multiplexer shown in FIG. 11.

Next, referring to FIGS. 11 and 12, an optical multiplexer which is a fourth embodiment of the optical system according to the present invention is shown. FIG. 11 is a plan view of the fourth embodiment optical multiplexer according to the present invention. FIG. 12 is a front view of the optical multiplexer shown in FIG. 11.

The fourth embodiment optical multiplexer 90 according to the present invention has a structure similar to that of the first embodiment optical multiplexer 1 except for the optical waveguide 4. Thus, the same reference numbers as those of the multiplexer 1 are attached to components of the multiplexer 90 common to those of the multiplexer 1, and an explanation of said components of the multiplexer 90 is omitted.

As shown in FIGS. 11 and 12, the fourth embodiment optical multiplexer 90 has a substrate 2, three lenses 92a, 92b, 92c which are optical elements mounted on the substrate 2, three optical fibers 6a, 6b, 6c optically coupled to the respective lenses 92a, 92b, 92c, and an optical filter 8 disposed between the lens 92a and the lenses 92b, 92c. The lenses 92a, 92b, 92c are laminated onto the substrate 2.

The substrate 2 extends in the light-propagating direction A, the lenses 92a, 92b, 92c are laminated onto an intermediate section 2b of the substrate 2, which lenses are made of, for example, the same material as that of the cladding of the waveguide of the first embodiment optical multiplexer 1, and optical fiber support sections 10a, 10b, 10c for supporting the respective optical fibers 6a, 6b, 6c are provided at opposed ends 2a, 2c of the substrate 2. The substrate 2 also extends in the perpendicular or width direction B perpendicular to the light-propagating direction A and has an upper surface 2d extending in the light-propagating direction A and in the width direction B. The substrate 2 is formed of a material having a crystal axis, for example, an organic material such as silicon, enabling the substrate 2 to be anisotropic etched. In the optical multiplexer 90, the crystal-axis direction of the substrate 2 conforms to the light-propagating direction A.

The lens 92a is disposed on one side of the intermediate section 2b of the substrate 2, while the lenses 92b, 92c are disposed on the other side thereof. The lenses 92a, 92b, 92c have respective optical axes 94a, 94b, 94c. The optical axes 94a, 94b are coaxial to each other and each of the optical axes 94a, 94b extends straightly and obliquely relative to the light-propagating direction A at an intersecting angle θ. The optical axis 94c is intersected obliquely with the optical axes 94a, 94b, and extends straightly and obliquely relative to the light-propagating direction A at the intersecting angle θ. The lenses 92a, 92b are disposed symmetrically about a point 94d where the optical axes 94a, 94b, 94c intersect each other. Further, the lenses 92a, 93c are disposed symmetrically with respect to a line 94e extending on the point 94d in the width direction B.

The substrate 2 is formed with an optical filter mounting groove 16 which is an optical filter mounting means for mounting the optical filter 8 extending across the intermediate section 2b of the substrate 2, and the optical filter 8 is fixed in the optical filter mounting groove 16 by means of an adhesive. The optical filter 8 is, for example, a dielectric multilayer film filter which can transmit a light having a first wavelength λ1 (for example, 1310 nm) and a light having a second wavelength λ2 (for example, 1490 nm) and reflect a light having a third wavelength λ3 (for example, 1550 nm).

The optical fiber 6a is disposed so that the optical axis 22a thereof is coaxial to the optical axis 94a of the lens 92a. The lens 92a is a convex lens having the optical axis 94a and being symmetrical relative to a plane perpendicular to the upper surface 2d, and is formed so that a focus point of the lens 92a is located at or near a tip of the optical fiber 6a. In the present embodiment, four sides 96 of the lens 92a are surfaces substantially perpendicular to the upper surface 2d of the substrate 2.

Since each of the lenses 92b, 92c has a structure similar to that of the lens 92a, an explanation of the former structure is omitted.

Next, an operation of the fourth embodiment optical multiplexer will be explained.

When a light having the first wavelength of λ1 is input into the optical fiber 6a, the light expands from a tip of the optical fiber 6a to enter the lens 92a so that it becomes a parallel light when it exit the lens 92a. This parallel light is transmitted through the optical filter 8 and input into the lens 92b. After the light exits from the lens 92b, it is converged at a tip of the optical fiber 6b, which tip is located at a focus point of the lens 92b, and then propagated to the optical fiber 6b. Further, when a light having the third wavelength of λ3 is input into the optical fiber 6b, the light expands from a tip of the optical fiber 6b to enter the lens 92b so that it becomes a parallel light when it exits the lens 92b. This parallel light is reflected at the optical filter 8 and input into the lens 92c. After the light exits from the lens 92c, it is converged at a tip of the optical fiber 6c, which tip is located at a focus point of the lens 92c, and then propagated to the optical fiber 6c. Further, when a light having the second wavelength of λ2 is input into the optical fiber 6b, the light expands from a tip of the optical fiber 6b to enter the lens 92b so that it becomes a parallel light when it exits the lens 92b. This parallel light is transmitted through the optical filter 8 and input into the lens 92a. After the light exits from the lens 92a, it is converged at a tip of the optical fiber 6a, which tip is located at a focus point of the lens 92a, and then propagated to the optical fiber 6a.

In the fourth embodiment optical multiplexer 90, an optical loss when a light is transmitted and received can be reduced. Specifically, when a transmittable zone through the filter 8 is a narrow zone equal to or less than 1 nm, unless a diameter of a beam of the transmitting light is about 100 μm, an optical loss when the light is transmitted through the filter 8 becomes large. On the other hand, in the optical multiplexer 90, since the light is expanded in a horizontal direction, such an optical loss when the light is transmitted through the filter 8 can be reduced so that an optical loss when a light is transmitted and received can be reduced.

Next, an example of a manufacturing method of the fourth embodiment optical multiplexer will be explained.

A method of manufacturing the fourth embodiment optical multiplexer 90 according to the present invention is similar to the method of manufacturing the first embodiment optical multiplexer 1 except that the lenses 92a, 92b, 92c are formed instead of the waveguide layer 4. Thus, only parts in the method of the fourth embodiment optical multiplexer 90 different from those in the method of the first embodiment will be explained; namely, an explanation of the parts common to those of the first embodiment is omitted.

After the V-shaped sub-grooves 28a, 28c and the recess 28b are formed, the lenses 92a, 92b, 92c are formed in the middle section 2b of the substrate 2. Specifically, in case the lenses 92a, 92b, 92c are made of polymer material such as polyimide fluorite, the cladding layer is made by means of spin coating or molding. Then, the cladding layer is removed by means of a process such as photolithography, reactive ion etching or a mechanical way such as stamping so that portions corresponding to the lenses 92a, 92b, 92c are left to form the lenses 92a, 92b, 92c in a desired form.

The steps of forming the V-shaped sub-grooves 28a, 28c and the recess 28b and forming the lenses 92a, 92b, 92c are performed so that when the optical fibers 6a, 6b, 6c are mounted onto the V-shaped sub-grooves 28a, 28c, the optical fibers 6a, 6b, 6c are aligned to the optical axes of the lenses 92a, 92b, 92 with a submicron-degree of accuracy. Later steps are similar to those in the manufacturing method of the first embodiment optical multiplexer 1.

Figure 13:
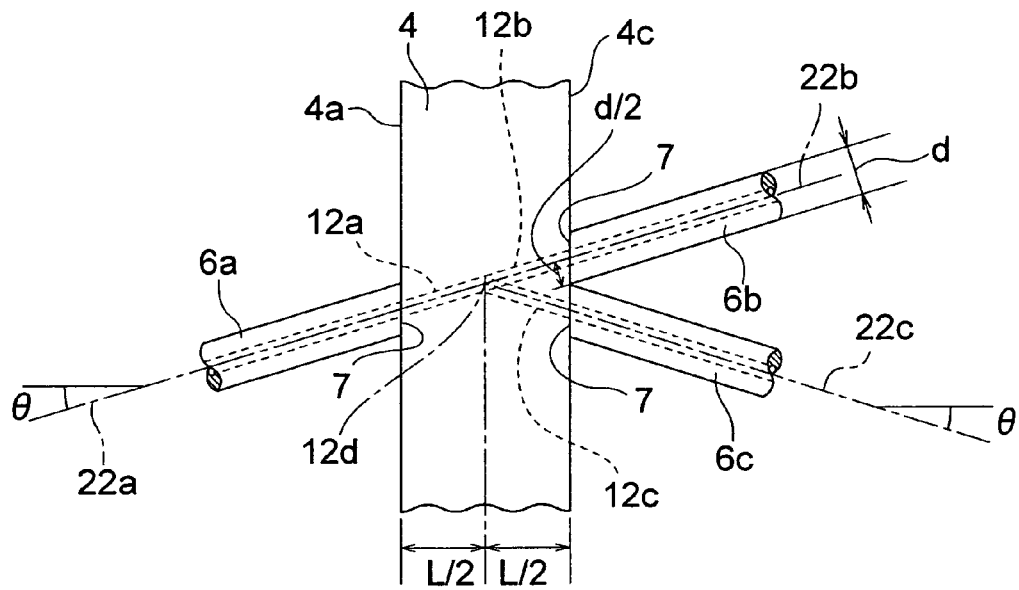
FIG. 13 is a view for explaining a minimum turn-back length.
Figure 14:
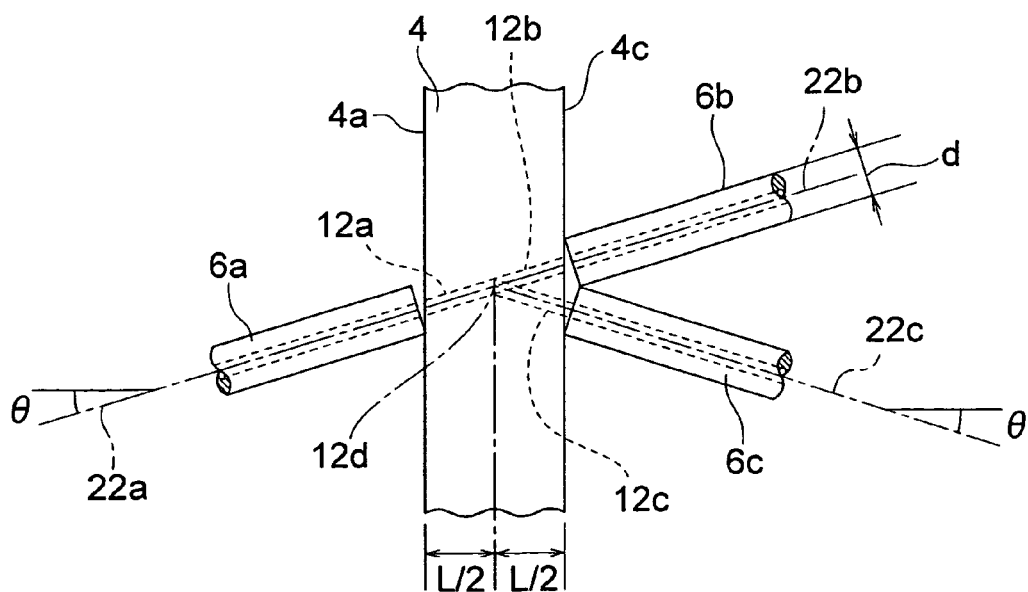
FIG. 14 is a view for explaining a minimum turn-back length.

Next, referring to FIGS. 13 and 14, a turn-back length will be explained. FIGS. 13 and 14 are views for explaining a minimum turn-back length in the optical multiplexers 1, 50, 70. As shown in FIGS. 13 and 14, the turn-back length L/2 in the optical multiplexers 1, 50, 70 is a length from the intersecting location 12d to the end surfaces 4a, 4c of the optical waveguide 4 in the light-propagating direction A. In other words, the turn-back length L/2 is a half length of a minimum distance between the optical fiber 6a and the optical fibers 6b, 6c in the light-propagating direction A. In the above-stated embodiment, the optical fibers 6b, 6c can be disposed so as to become close to each other until they physically contact each other. When the optical fibers 6b, 6c contact each other, the turn-back length L/2 becomes minimum.

As shown in FIG. 13, when the end surfaces 7 of the optical fibers 6a, 6b, 6c are respectively oblique relative to the optical axes 22a, 22b, 22c, the minimum turn-back length L/2 is obtained by the following equation (1);

$$L/2 = d/2 * 1/\sin\theta \qquad \text{equation (1)},$$

wherein d indicates a diameter of each of the optical fibers 6a, 6b, 6c.

Further, as shown in FIG. 14, when the end surfaces 7 of the optical fibers 6a, 6b, 6c are respectively perpendicular to the optical axes 22a, 22b, 22c, the minimum turn-back length L/2 is obtained by the following equation (2);

$$L/2 = d/2 * 1/\sin\theta * d * \sin\theta \qquad \text{equation (2)}.$$

For example, when the outer diameter d of each of the optical fibers 6a, 6b, 6c is 125 μm and the intersecting angle θ is 8 degrees, the minimum turn-back length L/2 is 0.0432 mm.

Figure 15:
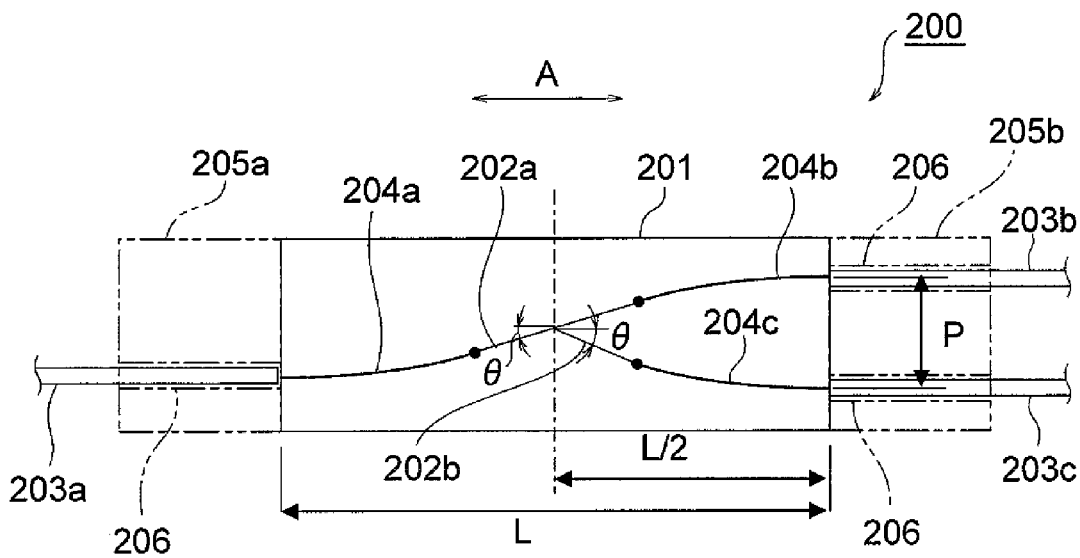
FIG. 15 is a schematic view of an optical multiplexer in the prior art.
Figure 16:
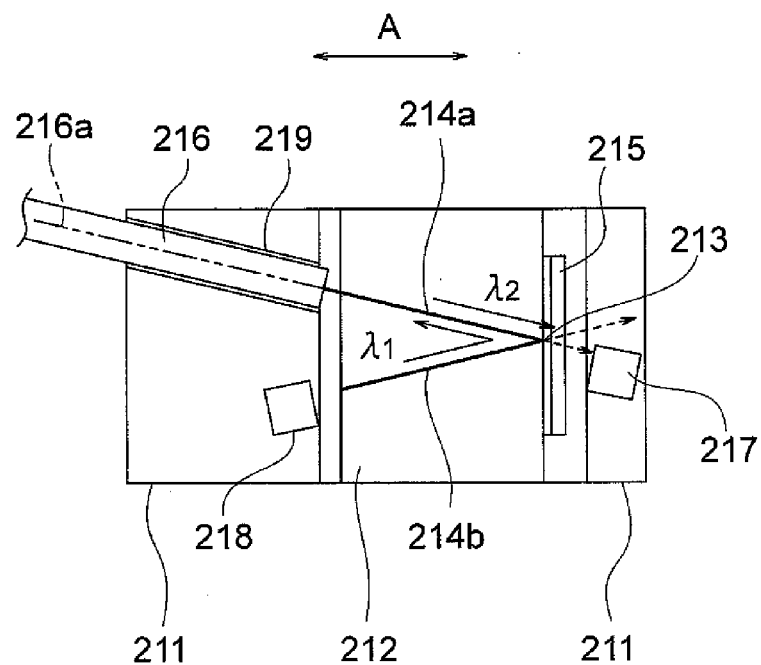
FIG. 16 is a schematic view of an optical transmitter/receiver in the prior art.

In the prior art optical multiplexer 200 shown in FIG. 15, when a pitch P between the optical fibers 6b, 6c is 500 μm, a curvature radius of each of the extended portions 204b, 204c is 15 mm, and the angle θ of each of the core portions 204b, 204c relative to the light-propagating direction A is 8 degrees, the turn-back length L/2 becomes 2.856 mm. In view of this turn-back length, a length of the optical multiplexers according to the present invention in the light-propagating direction A can be greatly reduced.

In the fourth-embodiment optical multiplexer 90, as shown in FIG. 11, the turn-back length L/2 is a length from the intersecting location 94d to the end surfaces 2e, 2f of the intermediate section 2b of the substrate 2 in the light-propagating direction A. The calculation of the minimum turn-back length L/2 of the optical multiplexer 90 is similar to that of the minimum turn-back length L/2 of the first to third embodiments optical multiplexers 1, 50, 70, and thus the explanation of the former calculation is omitted.

Figure 17:
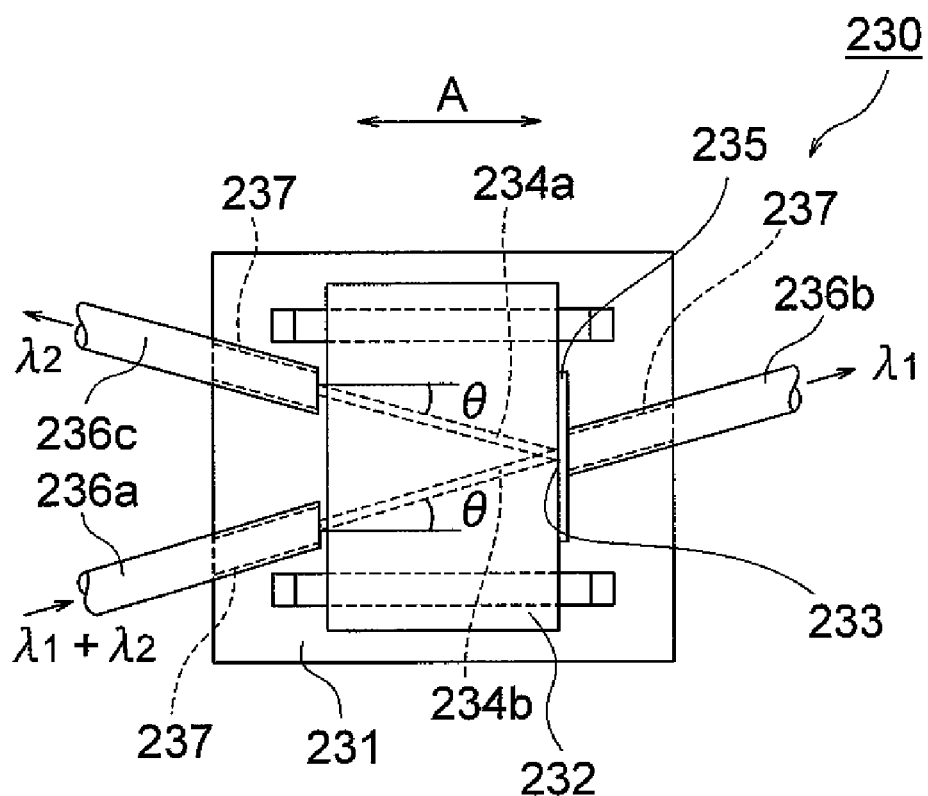
FIG. 17 is a schematic view of an optical multiplexer in the prior art.

Next, an offset between the center of the core portion and the center of the optical fiber will be explained. In the above-stated embodiment, all of the respective offsets between the centers of the core portions 12a, 12b, 12c and the centers of the optical fibers 6a, 6b, 6c could have been ranged within 0.3-1.0 μm, while, in the prior art optical multiplexer 230 shown in FIG. 17, such offsets are estimated to be within a range of 10-50 μm. Thus, in the optical multiplexers 1, 50, 70, 90, the plurality of core portions 12a, 12b, 12c of the optical waveguide 4 which obliquely intersect each other or lenses 92a, 92b, 92c are allowed to be positioned relative to the optical fibers 6a, 6b, 6c optically coupled to the respective core portions 12a, 12b, 12c or the lenses 92a, 92b, 92c with a high degree of accuracy.

The above-stated offset was measured as follows. In the first embodiment optical multiplexer 1 as an example, firstly, a portion including the end surface of the optical fiber 6a and the end surface 4a of the optical waveguide 4 was cut by means of dicing in a direction perpendicular to the core portion 12a and the optical axis 22a of the optical fiber 6a. Next, in the cut portion, the location of a center of the core portion 12a and the location of a center of the optical fiber 6a were measured by means of a metallographic microscope (magnification power of 100). Concretely, a coaxial incident light is illuminated to the cut portion from the upper side thereof, while a transmitting light is illuminated to the same from the lower side thereof. Further, a direction of these lights is aligned with the optical axis 22a of the optical fiber 6a so that the center of the optical fiber 6a and the center of the core portion 12a of the optical waveguide 4 can be seen in the same screen. By using an image obtained from the metallographic microscope, the location of the center of the optical fiber and the location of the center of the core portion were measured.

The embodiments of the present invention have been explained, but the present invention is not limited to the above-mentioned embodiments and it is apparent that the embodiments can be changed within the scope of the present invention set forth in the claims.

In the above-explained embodiments, they have a state in which the optical filter is mounted into the optical filter mounting means. However, the scope of the present invention is not limited to such a state, and includes an optical system which is an actual commercial product and does not have the optical filter mounted thereinto so long as it becomes an optical multiplexer according to the present invention when the optical filter is mounted into said optical system.

In the above-stated embodiments, the optical element is an optical waveguide or lens, but is not limited to the same and may be, for example, an optical transmitter or an optical receiver.

In the first to third embodiments, the number of the core portions of the optical waveguide and the number of the optical fibers are three, but they may be one, two, four or more depending on the number of optical fiber(s) obliquely disposed relative to the optical axis.

In the above-stated embodiments, the V-shaped sub-grooves 28a, 28c are employed as grooves for supporting optical fibers, but a groove having an inverted-trapezoidal cross section which is similar to a cross section of the recess 28b and has a lower base and an upper base longer than the lower base can be employed, for example, when the intersecting angle θ is large.

In the above-stated fourth embodiment optical multiplexer 90 and lenses 92a, 92b, 92c are substituted for the optical waveguide 4 in the first embodiment optical multiplexer 1. In this connection, the lenses 92a, 92b, 92c can be also substituted for the optical waveguide in the second embodiment optical multiplexer 50 or in the third embodiment optical multiplexer 70.

In the above-stated first embodiment optical multiplexer 1 and the fourth embodiment optical multiplexer 90, the depth DS of the recess 28b and the depth DG of the grooves 26a, 26b are preferably larger than the depth DV of the sub-grooves 28a, 28c. However, the depths DS, DG may be equal to the depth DV or the depth DV may be larger than the depths DS, DG so long as the offset between the core portion of the optical waveguide and the core of the optical fiber is within a permissible range.

What is claimed is:

1. An optical system comprising:
   a substrate; and
   an optical waveguide which is formed on the substrate and to which optical fibers are to be optically coupled;
   wherein the optical waveguide has a plurality of straight core portions which obliquely intersect each other,
   the substrate has positioning sections for positioning a plurality of optical fibers optically coupled to two or more of the plurality of the core portions, the positioning sections having grooves on which the respective optical fibers are supported,
   when the plurality of optical fibers are supported on the respective grooves, offsets between centers of the plurality of the core portions and respective centers of the plurality of the optical fibers coupled to the core portions are equal to or less than 5 μm,
   the substrate has a crystal axis,
   when supported on the respective grooves, at least one of the optical fibers is obliquely positioned relative to the crystal axis,
   the groove for the at least one of the optical fibers includes a plurality of sub-grooves respectively formed along a plurality of axes extending in a direction of the crystal axis, and
   the sub-grooves are continuously disposed and gradually shifted in a direction lateral to the crystal axis so that the sub-grooves are arranged along an optical axis of the at least one of the optical fibers to be obliquely disposed relative to the crystal axis, and the sub-grooves have the same depth from a surface of the substrate and are shaped so that, when the plurality of optical fibers are supported on the respective grooves, the optical axis of the at least one of the optical fibers obliquely disposed relative to the crystal axis will lie in a single plane parallel to the surface of the substrate.

2. The optical device according to claim 1, wherein the offsets are within a range of 0.3-1.0 μm.

3. The optical system according to claim 1, wherein the plurality of sub-grooves are simultaneously formed by means of anisotropic etching by using a mask having straight contour lines opposing each other and extending parallel to the optical axis of the optical fiber positioned on the plurality of the sub-grooves.

4. The optical system according to claim 1, wherein each of the grooves has a cross section in a form of a V-shape or inverted trapezoid.

5. The optical system according to claim 1, wherein each of the sub-grooves has a cross section in a form of a V-shape.

6. The optical system according to claim 1, further comprising a plurality of optical fibers supported in the grooves and optically coupled to two or more of the plurality of the core portions.

7. An optical system comprising:
   a substrate; and
   an optical waveguide which is formed on the substrate and to which optical fibers are to be optically coupled;
   wherein the optical waveguide has a plurality of straight core portions which obliquely intersect each other,
   the substrate has a crystal axis and positioning sections for positioning a plurality of optical fibers optically coupled to two or more of the plurality of core portions, the positioning sections having grooves on which the respective optical fibers are supported,
   at least one of the optical fibers is to be obliquely positioned relative to the crystal axis,
   the grooves include at least two sub-grooves for supporting the at least one of the optical fibers at least two locations,
   the at least two sub-grooves are formed along respective axes extending in a crystal-axis direction and shifted from each other both in the crystal-axis direction and in a direction perpendicular to the crystal-axis direction, the at least two sub-grooves being arranged along an optical axis of the at least one of the optical fibers to be obliquely disposed relative to the crystal axis, and the at least two sub-grooves have the same depth from a surface of the substrate and are shaped so that, when the plurality of optical fibers are supported on the respective grooves, the optical axis of the at least one of the optical fibers obliquely disposed relative to the crystal axis will lie in a single plane parallel to the surface of the substrate, and
   the substrate has a recess for preventing the optical fiber to be positioned on the at least two sub-grooves from contacting the substrate between the at least two sub-grooves.

8. The optical system according to claim 7, wherein a depth of the recess is larger than that of the sub-grooves.

9. The optical system according to claim 7, wherein when the plurality of optical fibers are supported on the respective grooves, offsets between centers of the plurality of the core portions and respective centers of the plurality of the optical fibers coupled to the core portions are within a range of 0.3-1.0 μm.

10. The optical system according to claim 7, wherein each of the grooves has a cross section in a form of a V-shape or inverted trapezoid.

11. The optical system according to claim 7, wherein each of the at least two sub-grooves has a cross section in a form of a V-shape.

12. The optical system according to claim 7, further comprising a plurality of optical fibers supported in the grooves and optically coupled to two or more of the plurality of the core portions.

13. An optical system comprising:
   a substrate; and
   an optical waveguide which is formed on the substrate and to which optical fibers are optically coupled;
   wherein the optical waveguide has an end surface and a plurality of straight core portions which intersect each other, each core portion extending from the end surface obliquely relative to a light-propagating direction at an intersecting angle θ,
   the substrate has a plurality of positioning sections for positioning a plurality of optical fibers optically coupled to two or more of the plurality of core portions, the positioning sections having grooves for supporting respective optical fibers,
   a turn-back length which is a distance in the light-propagating direction between the end surface of the optical waveguide and a location where the core portions which intersect each other is within a range from a to 2*a,
   when tips of the optical fibers are obliquely cut at the intersecting angle θ, a is calculated by the following equation (1);

$$a = d/2 * 1/\sin\theta \qquad \text{equation (1)}$$

when tips of the optical fibers are perpendicularly cut, a is calculated by the following equation (2);

$$a = d/2 * 1/\sin\theta - d*\sin\theta \qquad \text{equation (2), and}$$

d indicates an outer diameter of the optical fibers.

14. The optical system according to claim 13,
wherein the substrate has a crystal axis,
at least one of the optical fibers is positioned obliquely relative to the optical axis,
the grooves include at least two sub-grooves for supporting the at least one of the optical fibers at least two locations,
the at least two sub-grooves are formed along respective axes extending in a crystal-axis direction and shifted from each other both in the crystal-axis direction and in a direction perpendicular to the crystal-axis direction, and
the substrate has a recess for preventing the optical fiber disposed on the at least two sub-grooves from contacting the substrate between the at least two sub-grooves.

15. The optical system according to claim 14, wherein a depth of the recess is larger than that of the sub-grooves.

16. The optical system according to claim 13,
wherein the substrate has a crystal axis,
at least one of the optical fibers is positioned obliquely relative to the optical axis,
the grooves include a plurality of sub-grooves respectively formed along a plurality of axes extending in a crystal-axis direction,
the plurality of sub-grooves are continuously disposed and gradually shifted in a direction lateral to the crystal axis so that the sub-grooves are arranged along an optical axis of the at least one of the optical fibers obliquely disposed relative to the crystal axis.

17. The optical system according to claim 16, wherein the plurality of grooves are simultaneously formed by means of anisotropic etching by using a mask having straight contour lines opposing each other and extending parallel to the optical axis of the optical fiber positioned on the grooves.

18. The optical system according to claim 10, wherein each of the grooves is formed along an optical axis of the optical fiber supported by the groove by means of molding by using a mold.

19. The optical system according to claim 18, wherein the substrate is a glass substrate or a resin substrate.

20. The optical system according to claim 13, wherein each of the grooves is formed so that an extended line of a centerline of each of the core portions conforms to a centerline of the optical fiber optically coupled to the core portion.

21. The optical system according to claim 20, wherein when the plurality of optical fibers are supported on the grooves, offsets between centers of the plurality of core portions and centers of the respective optical fibers optically coupled to the core portions are equal to or less than 5 µm.

22. The optical system according to claim 21, wherein the offsets are within a range of 0.3-1.0 µm.

23. The optical system according to claim 13, wherein each of the grooves has a cross section in a form of a V-shape or inverted trapezoid.

24. An optical system comprising:
a substrate having a crystal axis; and
an optical element mounted on the substrate;
wherein the substrate has a first positioning section for positioning a first optical fiber on the substrate obliquely relative to the crystal axis in order to optically couple the first optical fiber to the optical element,
the first positioning section includes at least two first sub-grooves for supporting the first optical fiber at least two locations,
the at least two first sub-grooves are formed along respective axes extending in a crystal-axis direction and shifted from each other both in the crystal-axis direction and in a direction perpendicular to the crystal-axis direction, the at least two sub-grooves being arranged along an optical axis of the first optical fiber to be supported thereon, and the at least two sub-grooves have the same depth from a surface of the substrate and are shaped so that, when the first optical fiber is supported on the respective grooves, the optical axis of the first optical fiber will lie in a single plane parallel to the surface of the substrate, and
the substrate has a first recess for preventing the first optical fiber to be positioned on the at least two first sub-grooves from contacting the substrate between the at least two first sub-grooves.

25. The optical system according to claim 24, wherein a depth of the first recess is larger than that of the first sub-grooves.

26. The optical system according to claim 25, wherein each of the first sub-grooves has a cross section in a V-shaped form or in an inverted-trapezoid form.

27. The optical system according to claim 24, further comprising a second positioning section for positioning a second optical fiber on the substrate, the second optical fiber being optically coupled to the optical element,
wherein the second positioning section has a second groove for supporting the second optical fiber so that an extended line of an optical axis of the second optical fiber obliquely intersects an extended line of an optical axis of the first optical fiber positioned by the first positioning section.

28. The optical system according to claim 27,
wherein the second groove includes at least two second sub-grooves for supporting the second optical fiber at least two locations,
the at least two second sub-grooves are formed along respective axes extending in the crystal-axis direction and shifted from each other both in the crystal-axis direction and in a direction perpendicular to the crystal-axis direction, the at least two second sub-grooves being arranged along an optical axis of the second optical fiber to be supported thereon, and the at least two second sub-grooves have the same depth from a surface of the substrate and are shaped so that, when the second optical fiber is supported on the respective grooves, the optical axis of the second optical fiber will lie in a single plane parallel to the surface of the substrate, and
the substrate has a second recess for preventing the second optical fiber to be positioned on the at least two second sub-grooves from contacting the substrate between the at least two second sub-grooves.

29. The optical system according to claim 28, wherein a depth of the second recess is larger than that of the second sub-grooves.

30. The optical system according to claim 24, wherein the optical element is an optical waveguide or a lens laminated on the substrate.

31. The optical system according to claim 27,
wherein the optical element is an optical waveguide laminated on the substrate,
the optical waveguide has a first core portion optically coupled to the first optical fiber, and a second core portion optically coupled to the second optical fiber, and
an optical-filter mounting means for mounting an optical filter is provided at a location where the first core portion and the second core portion intersect.

32. The optical system according to claim 31,
wherein the first sub-grooves are formed so that an extended line of a centerline of the first core portion conforms to an extended line of a centerline of the first optical fiber optically coupled to the first core portion, and the second groove is formed so that an extended line of a centerline of the second core portion conforms to an extended line of a centerline of the second optical fiber optically coupled to the second core portion.

33. The optical system according to claim 24, wherein each of the at least two sub-grooves has a cross section in a form of a V-shape.

34. The optical system according to claim 24, further comprising a first optical fiber supported by first positioning section and optically coupled to the optical element.

35. The optical system according to claim 24, further comprising a first optical fiber supported by the first groove and optically coupled to the optical element.

36. The optical system according to claim 28, further comprising a second optical fiber supported by the second groove and optically coupled to the optical element.

* * * * *